United States Patent
Kokumai et al.

(10) Patent No.: US 8,761,496 B2
(45) Date of Patent: Jun. 24, 2014

(54) IMAGE PROCESSING APPARATUS FOR CALCULATING A DEGREE OF SIMILARITY BETWEEN IMAGES, METHOD OF IMAGE PROCESSING, PROCESSING APPARATUS FOR CALCULATING A DEGREE OF APPROXIMATION BETWEEN DATA SETS, METHOD OF PROCESSING, COMPUTER PROGRAM PRODUCT, AND COMPUTER READABLE MEDIUM

(75) Inventors: Yuji Kokumai, Tokyo (JP); Hideki Sasaki, Bellevue, WA (US)

(73) Assignee: Nikon Corporation, Tokyo (JP)

( * ) Notice: Subject to any disclaimer, the term of this patent is extended or adjusted under 35 U.S.C. 154(b) by 932 days.

(21) Appl. No.: 12/453,560

(22) Filed: May 14, 2009

(65) Prior Publication Data

US 2009/0297044 A1 Dec. 3, 2009

Related U.S. Application Data

(60) Provisional application No. 61/202,784, filed on Apr. 3, 2009, provisional application No. 61/202,785, filed on Apr. 3, 2009, provisional application No. 61/202,786, filed on Apr. 3, 2009.

(30) Foreign Application Priority Data

| May 15, 2008 | (JP) | 2008-128880 |
|---|---|---|
| May 15, 2008 | (JP) | 2008-128883 |
| May 19, 2008 | (JP) | 2008-131370 |
| Nov. 26, 2008 | (JP) | 2008-301325 |

(51) Int. Cl.
*G06K 9/62* (2006.01)
*G06K 9/66* (2006.01)
*G06K 9/68* (2006.01)
*H04N 5/91* (2006.01)
*G06K 9/40* (2006.01)

(52) U.S. Cl.
CPC ... *H04N 5/91* (2013.01); *G06K 9/40* (2013.01)
USPC .............................. 382/155; 382/195; 382/218

(58) Field of Classification Search
USPC ......................................... 382/155, 195, 218
See application file for complete search history.

(56) References Cited

U.S. PATENT DOCUMENTS 6,272,247 B1 * 8/2001 Manickam et al. ........... 382/217
6,724,919 B1 * 4/2004 Akiyama et al. .............. 382/118
(Continued)

FOREIGN PATENT DOCUMENTS

| EP | 1 830 320 A1 | 9/2007 |
| JP | 2006-285385 | 10/2006 |

(Continued)

OTHER PUBLICATIONS

English Translation of the International Preliminary Report on Patentability mailed Jan. 20, 2011 in corresponding International Patent Application PCT/JP2009/002098.

(Continued)

*Primary Examiner* — Kathleen Y Dulaney

(57) ABSTRACT

There is provided an image processing apparatus including a weight generating section that generates weight data in which a weight of a first region is larger than a weight of a second region, where the first region has a larger difference between a target image and at least one of a plurality of to-be-selected images than the second region, a calculating section that calculates a degree of similarity between the target image and each of two or more of the plurality of to-be-selected images with a difference between the target image and the to-be-selected image being weighted in each region in accordance with the weight data, and an image selecting section that selects, from the two or more to-be-selected images, one or more to-be-selected images that are more similar to the target image by referring to the degrees of similarity of the two or more to-be-selected images.

39 Claims, 21 Drawing Sheets

(56) References Cited

U.S. PATENT DOCUMENTS

| | | |
|---|---|---|
| 6,801,645 B1 * | 10/2004 | Collins et al. ............... 382/130 |
| 7,362,886 B2 * | 4/2008 | Rowe et al. ................. 382/118 |
| 8,131,065 B2 * | 3/2012 | Li et al. ....................... 382/159 |
| 2002/0176626 A1 * | 11/2002 | Keaton et al. ............... 382/218 |
| 2005/0147302 A1 * | 7/2005 | Leung .......................... 382/190 |
| 2006/0285723 A1 * | 12/2006 | Morellas et al. ............. 382/103 |
| 2007/0041644 A1 * | 2/2007 | Kim et al. .................... 382/190 |
| 2007/0127817 A1 * | 6/2007 | Yokoi ........................... 382/181 |
| 2008/0037876 A1 * | 2/2008 | Galperin ....................... 382/203 |
| 2008/0069399 A1 | 3/2008 | Nagao et al. |
| 2008/0144891 A1 * | 6/2008 | Hwang et al. ................ 382/118 |
| 2008/0152225 A1 * | 6/2008 | Iwamoto ....................... 382/190 |
| 2008/0166026 A1 * | 7/2008 | Huang et al. ................. 382/118 |
| 2008/0240576 A1 * | 10/2008 | Lee ............................... 382/210 |
| 2009/0041340 A1 * | 2/2009 | Suzuki et al. ................ 382/159 |
| 2009/0175543 A1 * | 7/2009 | Nielsen ......................... 382/204 |
| 2009/0324026 A1 * | 12/2009 | Kletter ......................... 382/124 |

FOREIGN PATENT DOCUMENTS

| | | |
|---|---|---|
| JP | 2007-87306 | 4/2007 |
| JP | 2008-111671 | 5/2008 |

OTHER PUBLICATIONS

Michiyo Nishioka et al., "Measurement of Skin Texture Using Genetic Image Analysis", The Institute of Electronics, Information, and Communication Engineers, Technical Report of IEICE, NC2004-39, Jun. 2004, pp. 65-69.

Shinya Aoki et al., "ACTIT: Automatic Construction of Tree Structured Image Transformations" The Journal of the Institute of Image Information and Television Engineers, 1999, pp. 889-894.

Kohei Naito et al., Method of Automatically Generating Tree Structured Image Transformations that Automatically Corrects Teacher Images, ITE Technical Report, vol. 25, No. 24, pp. 1-6, Mar. 2001.

Japanese Office Action issued Mar. 26, 2013 in corresponding Japanese Application No. 2010-511885.

Masaki Maezono et al., "Research on the Design of an Image Filter Based on a Genetic Algorithm", Kagoshima Univ., Graduate School of Science and Engineering, Dept. of Information and Computer Science; pp. 373-374, 2002.

\* cited by examiner

IMAGE PROCESSING APPARATUS FOR CALCULATING A DEGREE OF SIMILARITY BETWEEN IMAGES, METHOD OF IMAGE PROCESSING, PROCESSING APPARATUS FOR CALCULATING A DEGREE OF APPROXIMATION BETWEEN DATA SETS, METHOD OF PROCESSING, COMPUTER PROGRAM PRODUCT, AND COMPUTER READABLE MEDIUM

CROSS REFERENCE TO RELATED APPLICATION

The present application claims priority from a Japanese Patent Application No. 2008-128880 filed on May 15, 2008, a Japanese Patent Application No. 2008-128883 filed on May 15, 2008, a Japanese Patent Application No. 2008-131370 filed on May 19, 2008, a Japanese Patent Application No. 2008-301325 filed on Nov. 26, 2008, a U.S. provisional application No. 61/202,784, filed on Apr. 3, 2009, a U.S. provisional application No. 61/202,785, filed on Apr. 3, 2009, and a U.S. provisional application No. 61/202,786, filed on Apr. 3, 2009, the contents of which are incorporated herein by reference.

BACKGROUND

1. Technical Field

The present invention relates to an image processing apparatus, an image processing method, a processing apparatus, a processing method, and a recording medium.

2. Related Art

A known image filter generating method uses evolutionary computation such as genetic algorithms or genetic programming (for example, see Non-Patent Document 1). This technique generates new image filters by repeatedly performing genetic operators such as crossover, mutation and selection on image filters multiple times. Such an image filter generating method based on evolutionary computation can reduce the amount of work required for designing optimal image filters for individual cases, which are difficult to be obtained analytically due to their complex configurations.

Non-Patent Document 1: Masaki MAEZONO et al., "Research on the Design of an Image Filter based on a Generic Algorithm", [online], Council for Improvement of Education through Computers, [Searched on Mar. 20, 2008], Internet <URL:http://www.ciec.or.jp/event/2003/papers/pdf/E00086.pdf>

When an image filter is generated by means of evolutionary computation, generation alternation repeatedly occurs before the target image filter is obtained. In each generation, a to-be-converted image is converted by using a plurality of image filters so that a plurality of to-be-selected images are generated. The to-be-selected images are compared with a target image. As a result of the comparison, one or more of the image filters are selected which can produce to-be-selected images that are more similar to the target image than the others. The selected image filters survive to the next generation.

As the generations proceed, an increasing number of the to-be-selected images generated by using the image filters are similar to the target image. In other words, the to-be-selected images only slightly differ from each other, which makes it difficult to distinguish image filters that should survive to the next generation from image filters that should perish in the current generation.

Therefore, after a certain number of generation alternations, the comparison between the to-be-selected images and the target image is preferably performed with different weights being assigned to a plurality of regions defined in each image. In this way, it becomes possible to easily determine whether the to-be-selected images are similar to the target image and to increase the accuracy of the image filter selection. For example, the comparison result obtained for an important region in each image is heavily weighted, and the comparison result obtained for an insignificant region in each image is lightly weighted. This weighting scheme can select image filters that provide accurate filtering for an important region in each image. It, however, is very difficult to determine appropriate weights for individual cases since it requires extensive experience and knowledge.

In addition to image filters, general data converters can similarly be generated by means of evolutionary computation. It is also very difficult to assign appropriate weights and select accurate data converters since it requires extensive experience and knowledge.

Here, a user of an image filter selected in the last generation is not allowed to check the weights assigned to the respective regions during the comparison between the to-be-selected images and the target image in each generation. In other words, the user cannot correct the process of determining the weight assigned to each region in the generations before the last generation, for example.

If the importance of each region is determined incorrectly in the images, an appropriate image filter cannot be selected even after the last generation is completed. If such occurs, the user of the image filter selected in the last generation is required to determine the weights to be reassigned to the individual regions and then restart the filter selecting procedure from the first generation.

SUMMARY

To solve the above-described problems, according to the first aspect related to the innovations herein, exemplary image processing apparatus, image processing method and recording medium may include a weight generating section that generates weight data in which a weight of a first region is larger than a weight of a second region, where the first region has a larger difference between a target image and at least one of a plurality of to-be-selected images than the second region, a calculating section that calculates a degree of similarity between the target image and each of two or more of the plurality of to-be-selected images with a difference between the target image and the to-be-selected image being weighted in each region in accordance with the weight data, and an image selecting section that selects, from the two or more to-be-selected images, one or more to-be-selected images that are more similar to the target image by referring to the degrees of similarity of the two or more to-be-selected images.

According to the second aspect related to the innovations herein, exemplary image processing apparatus, image processing method and recording medium may include a weight generating section that generates weight data in which a weight of a first region is larger than a weight of a second region, where the first region has a larger difference between any two or more of a plurality of to-be-selected images than the second region, a calculating section that calculates a degree of similarity between a target image and each of two or more of the plurality of to-be-selected images with a difference between the target image and the to-be-selected image being weighted in each region in accordance with the weight data, and an image selecting section that selects, from the two or more to-be-selected images, one or more to-be-selected images that are more similar to the target image, by referring to the degrees of similarity of the two or more to-be-selected images.

According to the third aspect related to the innovations herein, exemplary processing apparatus, processing method and recording medium may include a weight generating section that generates a weight data set in which a weight of first data is larger than a weight of second data, where the first data has a larger difference between data sets than the second data, the difference is calculated per data between the data sets each including a plurality of pieces of data, and the data sets form at least one pair of data sets chosen from a plurality of to-be-selected data sets and a target data set, a calculating section that calculates a degree of approximation between the target data set and each of two or more of the plurality of to-be-selected data sets, with a per-data difference between the target data set and the to-be-selected data set being weighted in each piece of data in accordance with the weight data set, and a data set selecting section that selects, from the two or more to-be-selected data sets, one or more to-be-selected data sets that are more approximate to the target data set, by referring to the degrees of approximation of the two or more to-be-selected data sets.

According to the fourth aspect related to the innovations herein, exemplary image processing apparatus, image processing method and recording medium may be designed for generating an image filter by combining together a plurality of filter parts each of which converts an input image into an output image, including a filter generating section that newly generates one or more image filters by replacing one or more filter parts constituting at least part of an existing image filter with one or more different filter parts, a filtering section that converts a to-be-converted image by using a plurality of image filters to generate a plurality of to-be-selected images, a weight generating section that generates weight data representing a weight assigned to each region of an image, based on a target image and at least one of the plurality of to-be-selected images, a weight display section that displays a weight assigning image representing a weight assigned to each region of an image in accordance with the weight data, a calculating section that calculates a degree of similarity between the target image and each of two or more of the plurality of to-be-selected images with a difference between the target image and the to-be-selected image being weighted in each region in accordance with the weight data, and a filter selecting section that selects one or more image filters that generate one or more to-be-selected images that are more similar to the target image, by referring to the degrees of similarity of the two or more to-be-selected images.

According to the fifth aspect related to the innovations herein, exemplary image processing apparatus, image processing method and recording medium may be designed for generating an image filter by combining together a plurality of filter parts each of which converts an input image into an output image, including a filter generating section that newly generates an image filter by replacing one or more filter parts constituting at least part of an existing image filter with one or more different filter parts, a filtering section that converts a to-be-converted image by using a plurality of image filters to generate a plurality of to-be-selected images, a weight receiving section that receives from a user weight data representing a weight assigned to each region in a target image and the plurality of to-be-selected images, a calculating section that calculates a degree of similarity between the target image and each of two or more of the plurality of to-be-selected images with a difference between the target image and the to-be-selected image being weighted in each region in accordance with the weight data, and a filter selecting section that selects one or more image filters that generate one or more to-be-selected images that are more similar to the target image based on the degrees of similarity of the two or more to-be-selected images.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
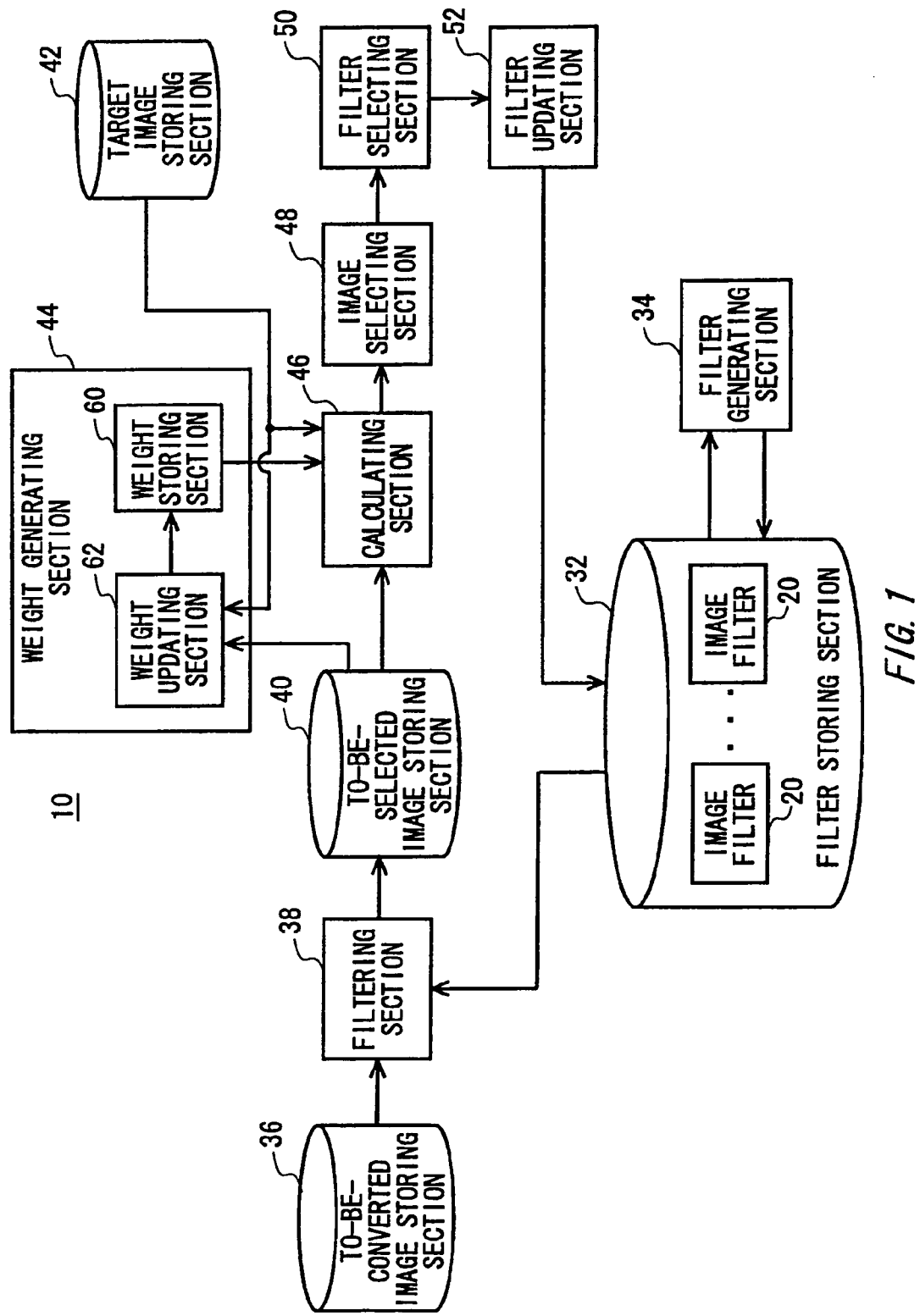
FIG. 1 illustrates the configuration of an image processing apparatus 10 relating to a first embodiment.

FIG. 1 illustrates the configuration of an image processing apparatus 10 relating to a first embodiment. The image processing apparatus 10 uses evolutionary computation to generate image filters 20 that are suitable for converting to-be-converted images into target images. The image processing apparatus 10 is realized by using a computer, in one example.

The image processing apparatus 10 includes a filter storing section 32, a filter generating section 34, a to-be-converted image storing section 36, a filtering section 38, a to-be-selected image storing section 40, a target image storing section 42, a weight generating section 44, a calculating section 46, an image selecting section 48, a filter selecting section 50, and a filter updating section 52. The filter storing section 32 stores a plurality of image filters 20, which are generated in advance and different from each other.

The filter generating section 34 generates image filters 20 differing from each other by combining together a plurality of filter parts 22. The filter parts 22 are each designed to convert an input image into an output image. The filter generating section 34 reads the image filters 20 stored on the filter storing section 32, in one example. Subsequently, the filter generating section 34 performs genetic operators such as crossover and mutation on the read image filters 20 to replace at least some of the filter parts 22 with different filter parts 22, thereby generating new image filters 20, in one example. After this, the filter generating section 34 returns the newly generated image filters 20 to the filter storing section 32, so that the filter storing section 32 stores the new image filters 20 in addition to the old image filters 20, in one example.

The to-be-converted image storing section 36 stores a to-be-converted image that is to be converted by the image filters 20. For example, the to-be-converted image may be a sample of the image that is actually processed by the image filters 20 in the applications using the image filters 20 generated by the image processing apparatus 10. For example, the to-be-converted image may be an image that is generated or captured by a user in advance.

The filtering section 38 sequentially obtains the image filters 20 stored on the filter storing section 32. The filtering section 38 sequentially uses the obtained image filters 20 to convert the to-be-converted image stored on the to-be-converted image storing section 36, thereby generating to-be-selected images. In other words, the filtering section 38 filters the to-be-converted image by using the respective image filters 20 to generate the to-be-selected images. The to-be-selected image storing section 40 stores the to-be-selected images generated by the filtering section 38. In one example, the to-be-selected image storing section 40 stores each of the to-be-selected images generated at the filtering section 38 by converting the to-be-converted image with the use of the image filters 20, in association with a corresponding image filter 20.

The target image storing section 42 stores a target image that is intended to be generated as a result of converting the to-be-converted image. For example, the target image may be a sample of the image that is expected to be obtained by filtering the to-be-converted image through the image filter 20 in the applications using the image filters 20 generated by the image processing apparatus 10. For example, the target image may be an image that is generated or captured by a user in advance. The target image storing section 42 may store a plurality of target images, for example.

The weight generating section 44 generates weight data representing a weight assigned to each region defined in an image. For example, the weight generating section 44 may generate, as the weight data, a weight assigning image in which the value (for example, the luminance value) of each pixel represents the weight of the pixel's position.

Note that the weight generating section 44 generates the weight data in which the weight assigned to a given region is larger than the weight assigned to a different region when the difference between the target image and at least one of the to-be-selected images is larger in the given region than the different region. For example, the weight generating section 44 may include a weight storing section 60 and a weight updating section 62. The weight storing section 60 stores the weight data. The weight updating section 62 updates the weight data stored on the weight storing section 60, for example, at each generation, in order to be continuously in compliance with the principle that the weight of the given region is larger than the weight of the different region when the difference is larger in the given region than in the different region.

The calculating section 46 calculates the degree of similarity between the target image and each of two or more of the to-be-selected images stored on the to-be-selected image storing section 40 with the difference between the target image and the to-be-selected image being weighted in each region in accordance with the weight data. The image selecting section 48 selects, from the two or more to-be-selected images, one or more to-be-selected images that are more similar to the target image by referring to the degrees of similarity of the two or more to-be-selected images.

The filter selecting section 50 selects one or more image filters 20 that have produced the to-be-selected images selected by the image selecting section 48, as image filters 20 that can convert the to-be-converted image into images that are more similar to the target image. The filter updating section 52 updates the image filters 20 stored on the filter storing section 32 based on the image filters 20 selected by the filter selecting section 50. For example, the filter updating section 52 may allow the selected image filters 20 to remain in the filter storing section 32 and delete the not-selected image filters 20 from the filter storing section 32.

The above-described image processing apparatus 10 repeatedly performs the operations of the filter generating section 34, the filter selecting section 50, and the filter updating section 52, a plurality of times (for example, over a plurality of generations). In this manner, the image processing apparatus 10 can generate an image filter 20 suitable for converting the to-be-converted image into the target image by using evolutionary computation.

Figure 2:
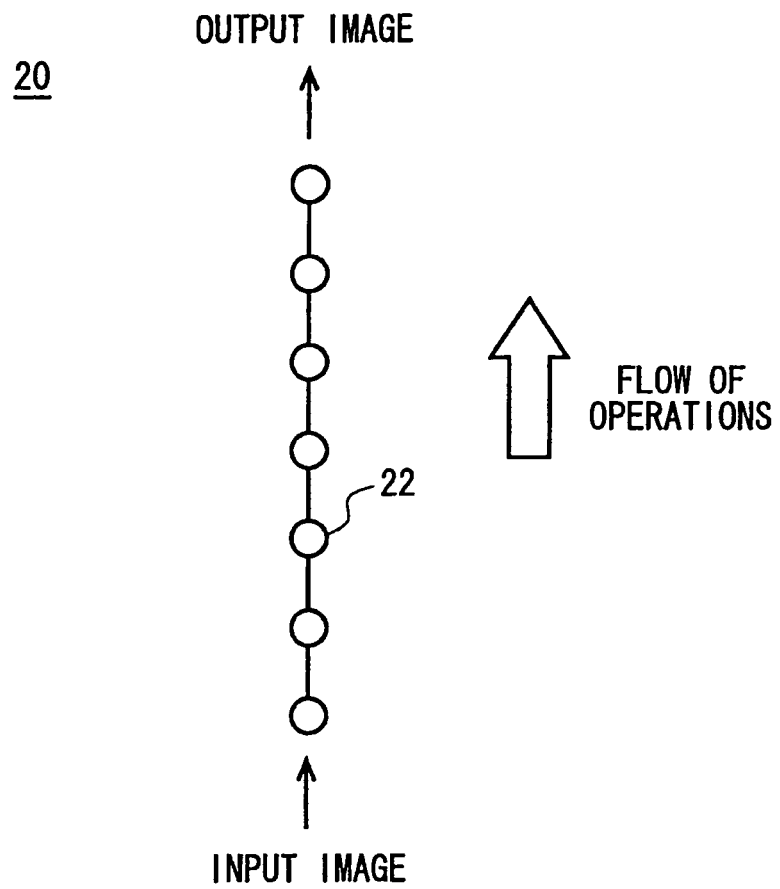
FIG. 2 illustrates an exemplary image filter 20 having filter parts 22 combined in series.
Figure 3:
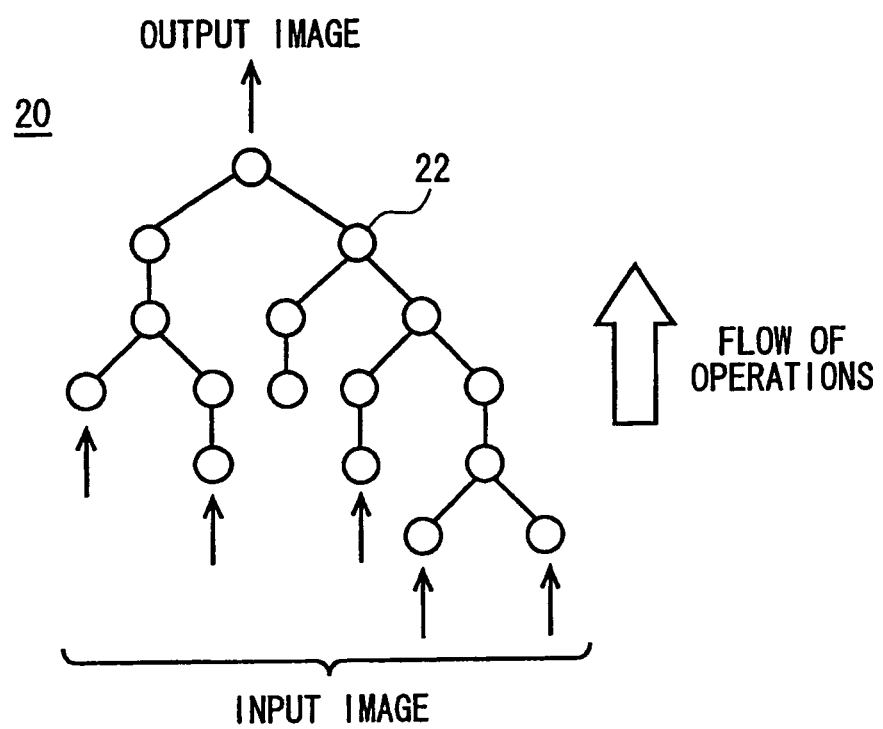
FIG. 3 illustrates an exemplary image filter 20 having filter parts 22 combined in a tree structure.

FIG. 2 illustrates an exemplary image filter 20 having filter parts 22 combined in series. FIG. 3 illustrates an exemplary image filter 20 having filter parts 22 combined in a tree structure.

An image filter 20 receives input image data, performs a filtering operation on the received input image data, and outputs output image data. For example, the image filter 20 may be a program designed to perform operations on image data. For example, the image filter 20 may be an arithmetic expression representing operations to be performed on image data.

The image filter 20 is formed by combining together a plurality of filter parts 22. For example, the image filter 20 may have the filter parts 22 combined in series as shown in FIG. 2. For example, the image filter 20 may have the filter parts 22 combined in a tree structure as shown in FIG. 3.

When configured such that the filter parts 22 are combined together in a tree structure, the image filter 20 receives input image data with a filter part 22 located at the bottom end of the tree structure and outputs output image data from a filter part 22 located at the top end of the tree structure. In this type of image filter 20, each of a plurality of filter parts 22 at the bottom end receives the same input image data. Alternatively, in this type of image filter 20, the plurality of filter parts 22 at the bottom end may respectively receive different pieces of input image data.

Each filter part 22 may be a program module, an arithmetic expression, or the like. Each filter part 22 receives image data output from an immediately preceding filter part 22, performs operations on the received image data, and sends the resulting image data to an immediately following filter part 22.

Each filter part 22 may perform monadic operations including, for example, a binarizing operation, a histogram operation, a smoothing operation, an edge detecting operation, a morphological operation and/or a frequency-domain operation (for example, low-pass and high-pass filtering operations). Alternatively, each filter part 22 may perform binary operations including, for example, an averaging operation, a subtraction operation and/or a fuzzy operation (for example, a logical addition operation, a logical multiplication operation, an algebraic sum operation, an algebraic product operation, a bounded sum operation, abounded product operation, a drastic sum operation, and a drastic product operation).

Figure 4:
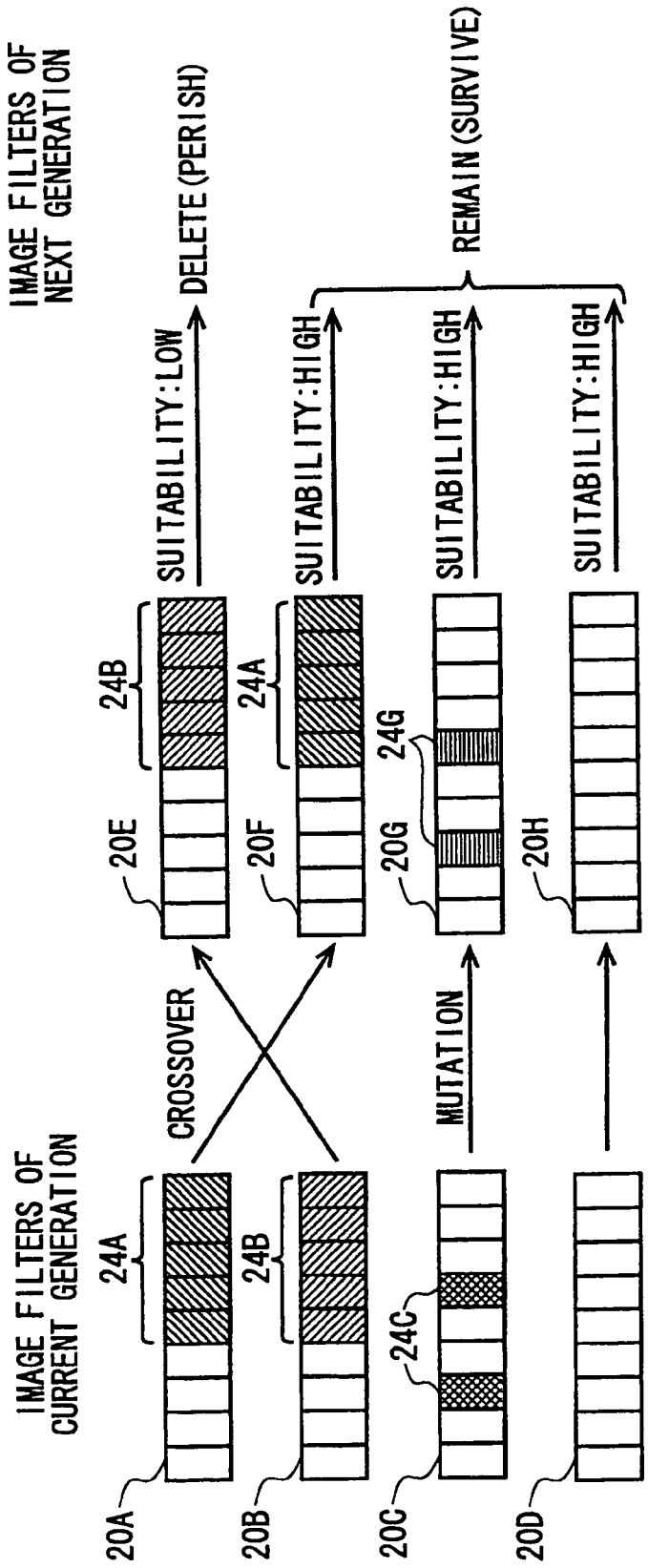
FIG. 4 illustrates exemplary genetic operators performed on the image filters 20 configured such that the filter parts 22 are combined in series.
Figure 5:
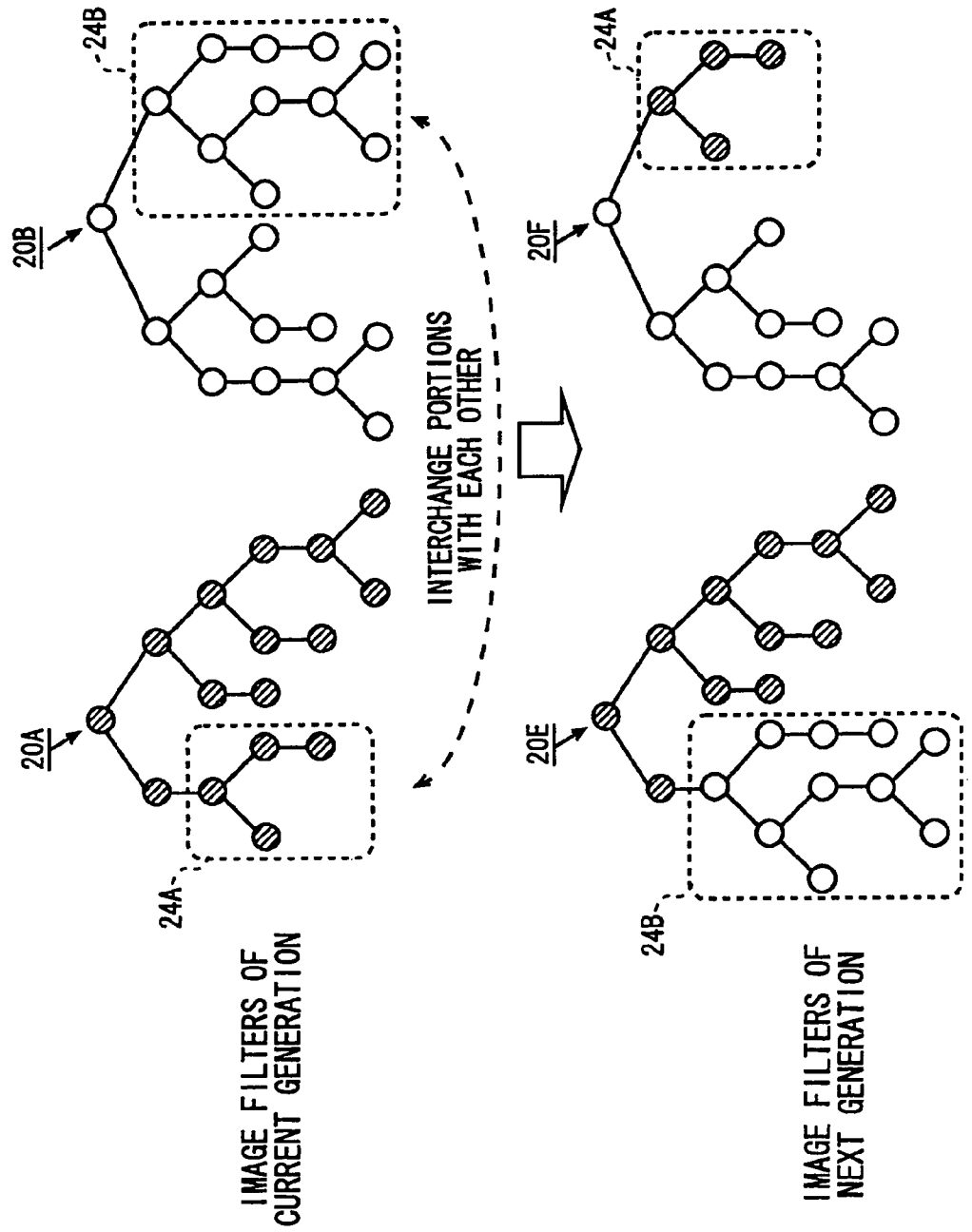
FIG. 5 illustrates an example of crossover performed on the image filters 20 configured such that the filter parts 22 are combined in a tree structure.
Figure 6:
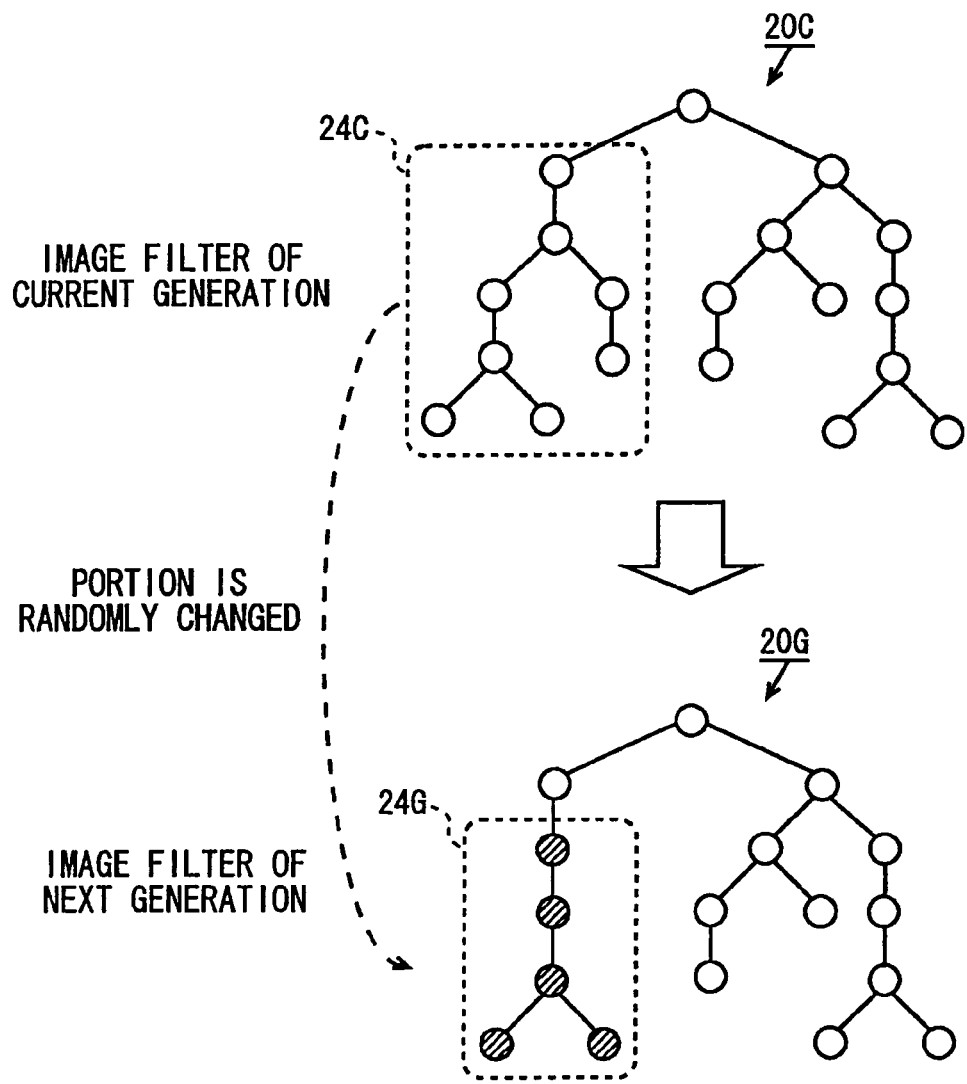
FIG. 6 illustrates an example of mutation performed on the image filters 20 configured such that the filter parts 22 are combined in a tree structure.

FIG. 4 illustrates exemplary genetic operators performed on the image filters 20 configured such that the filter parts 22 are combined in series. FIG. 5 illustrates an example of crossover performed on the image filters 20 configured such that the filter parts 22 are combined in a tree structure. FIG. 6 illustrates an example of mutation performed on the image filters 20 configured such that the filter parts 22 are combined in a tree structure.

For example, the filter generating section 34 may perform a genetic operator, for example, crossover on two or more image filters 20, to generate new two or more image filters 20. In one example, the filter generating section 34 may interchange a filter part group 24A constituting part of at least one existing image filter 20A and a filter part group 24B constituting at least part of a different existing image filter 20B with each other, thereby generating new image filters 20E and 20F, as shown in FIGS. 4 and 5. Here, a filter part group 24 refers to a combination of one or more filter parts 22.

For example, the filter generating section 34 may perform another genetic operator, for example, mutation on an image filter 20 to generate a new image filter 20. In one example, the filter generating section 34 may replace a filter part group 24C constituting part of an existing image filter 20C with a different filter part group 24G that is randomly selected, thereby generating a new image filter 20G, as shown in FIGS. 4 and 6.

For example, the filter generating section 34 may keep an image filter 20 of the current generation without a change in the next generation. In one example, the filter generating section 34 may generate an image filter 20H of the next generation, which contains the filter parts 22 of an image filter 20D of the current generation as they are, as shown in FIG. 4.

The filter selecting section 50 selects one or more image filters 20 from the image filters 20 generated by the filter generating section 34 through a technique modeling organism selection. For example, the filter selecting section 50 may preferentially select, from among the image filters 20, one or more image filters 20 that have higher degrees of suitability. In one example, the filter selecting section 50 may select one or more image filters 20 in accordance with techniques such as elite strategy and roulette wheel selection, by referring to the degrees of suitability of the image filters 20. The filter selecting section 50 stores the selected image filters 20 in the filter storing section 32, which survive to the next generation, and deletes the not-selected image filters 20 from the filter storing section 32, which perish in the current generation.

Figure 7:
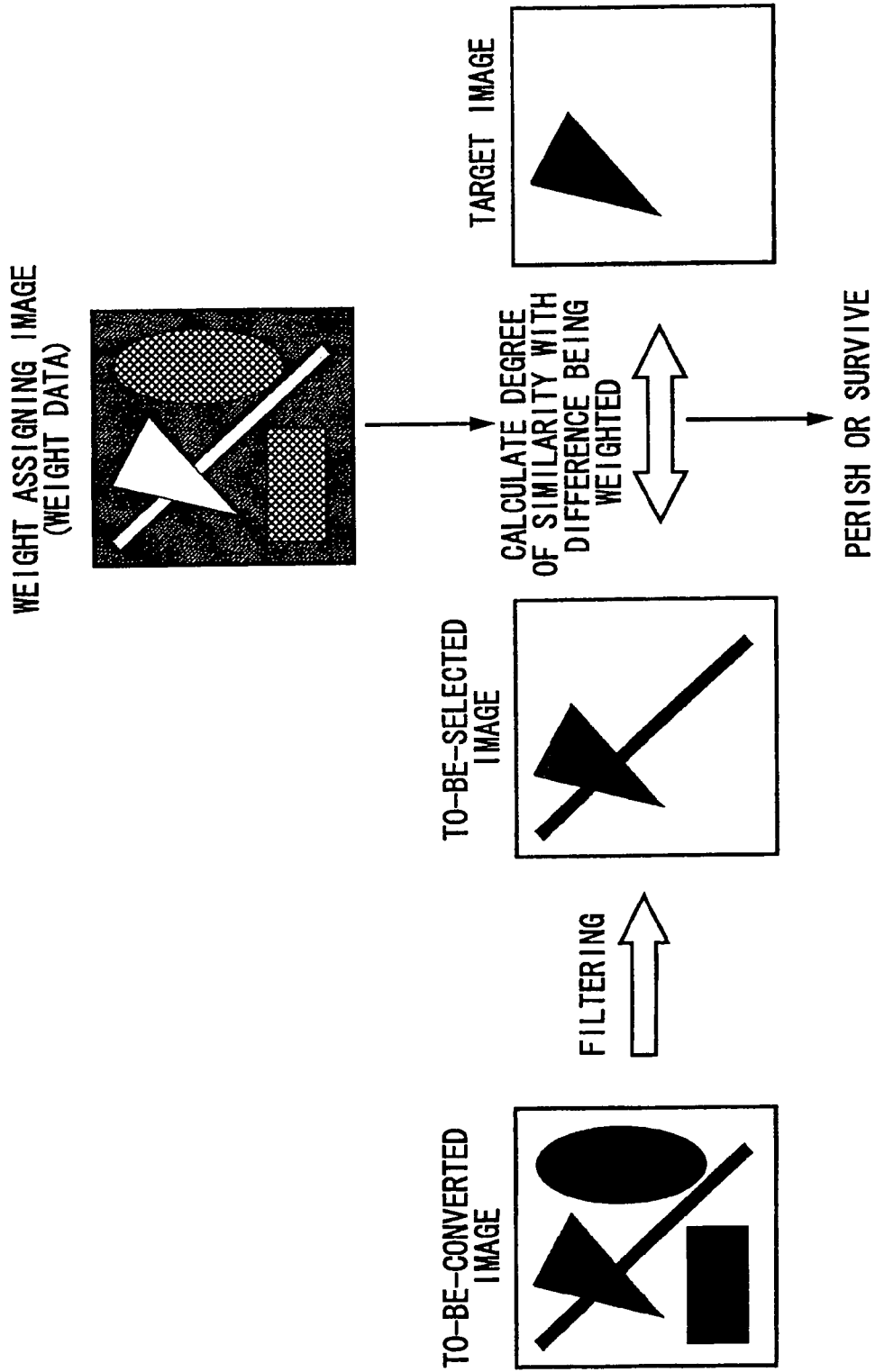
FIG. 7 illustrates an exemplary method for calculating the degree of similarity, which is shown as an exemplary parameter indicative of the degree of suitability of the image filter 20.

FIG. 7 illustrates an exemplary method for calculating the degree of similarity, which is shown as an exemplary parameter indicative of the degree of suitability of an image filter 20. According to the first embodiment, the calculating section 46 calculates the degree of similarity that is indicative of to what degree a to-be-selected image generated by converting the to-be-converted image by using the image filter 20 is similar to the target image. The degree of similarity is an exemplary parameter indicative of the degree of suitability of the image filter 20, and is used as an evaluation value or index whose value increases as the image filter 20 used to generate the to-be-selected image becomes more suitable.

The calculating section 46 compares the value of each region of the to-be-selected image with the value of a corresponding region of the target image to calculate a comparison value, and multiplies the comparison value of each region by a corresponding weight designated by the weight data. The calculating section 46 then calculates an average or a sum of the weighted comparison values of all the regions, and outputs the average or sum as the degree of similarity of the to-be-selected image.

For example, the calculating section 46 may calculate a difference or ratio between the luminance value of each pixel of the to-be-selected image and the luminance value of a corresponding pixel of the target image. For example, the calculating section 46 may then multiply the calculated difference or ratio of each pixel with a corresponding weight designated by the weight data, and calculate a sum or average of the weighted differences or ratios of all the pixels to calculate the degree of similarity of the to-be-selected image.

When the weight data is in the form of an weight assigning image, for example, the calculating section 46 may calculate the degree of similarity by performing operations represented by the following Expression 1. In this case, the to-be-selected images, the target image, and the weight assigning image all have the same size.

$$f = 1.0 - \frac{1}{Y_{max}} \left\{ \frac{\sum_{x=1}^{xmax} \sum_{y=1}^{ymax} \left( \begin{array}{c} I_{weight}(x, y) \times \\ |I_{target}(x, y) - I_{filter}(x, y)| \end{array} \right)}{\sum_{x=1}^{xmax} \sum_{y=1}^{ymax} (I_{weight}(x, y))} \right\} \quad (1)$$

In Expression 1, f denotes the degree of similarity, and $Y_{max}$ denotes a maximum luminance value.

Furthermore, x is a variable denoting a pixel position in the horizontal direction of the image, y is a variable denoting a pixel position in the vertical direction of the image, xmax is a constant number indicating the number of pixels in the horizontal direction of the image, tymax is a constant number indicating the number of pixels in the vertical direction of the image.

Furthermore, Iweight(x, y) denotes the luminance value of a pixel whose position is represented as (x, y) in the weight assigning image, Itarget(x, y) denotes the luminance value of a pixel whose position is represented as (x, y) in the target image, and Ifilter(x, y) denotes the luminance value of a pixel whose position is represented as (x, y) in the to-be-selected image.

As indicated by the numerator portion within the braces in Expression 1, the calculating section 46 calculates a weighted difference value for each of the pixels of the image, by multiplying the absolute value of the difference in luminance value between the target image and the to-be-selected image with the luminance value of the weight assigning image, and then calculates a total weighted difference value by calculating the sum of the calculated weighted difference values of all the pixels. Furthermore, as indicated by the denominator portion within the braces in Expression 1, the calculating section 46 calculates a total weight by calculating the sum of the luminance values of all the pixels of the weight assigning image. Furthermore, the calculating section 46 calculates a normalized value (the second term in Expression 1) by multiplying a divided value obtained by dividing the total weighted difference value by the total weight (within the braces in Expression 1) with an inverse of the maximum luminance value ($1/Y_{max}$). The calculating section 46 then subtracts the normalized value from 1 to obtain the degree of similarity f. In the above-described manner, the calculating section 46 can calculate the degree of similarity between the target image and the to-be-selected image with the difference between the to-be-selected image and the target image being weighted in each region.

Figure 8:
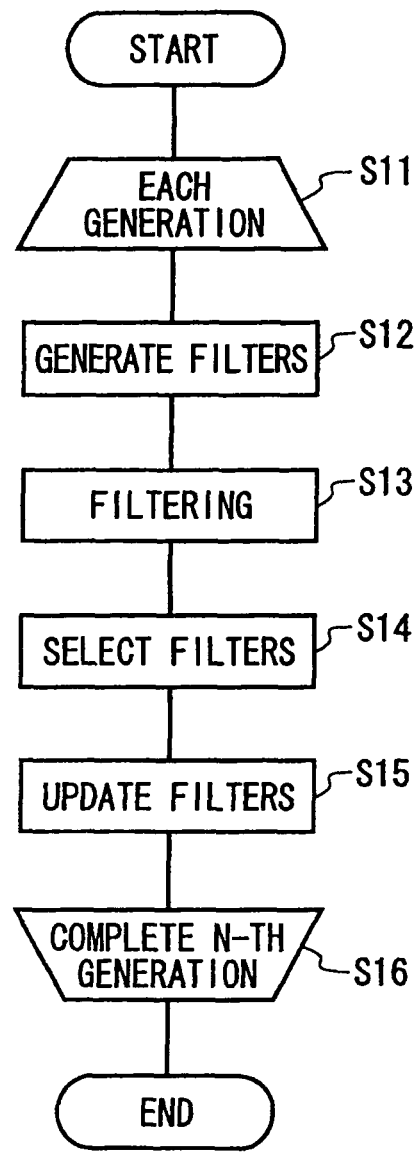
FIG. 8 is a flow chart illustrating the operations performed by the image processing apparatus 10.

FIG. 8 is a flow chart illustrating the operations performed by the image processing apparatus 10. The image processing apparatus 10 repeats a procedure of the steps S12 to S16 multiple times (for example, over multiple generations) (step S11, step S16).

In each generation, the filter generating section 34 performs genetic operators such as crossover and mutation on a plurality of image filters 20 that have survived through the preceding generation, to generate a plurality of new image filters 20 (step S12). In the first generation, for example, the filter generating section 34 may perform genetic operators on a plurality of image filters 20 that are generated by a user or the like in advance, to generate a plurality of new image filters 20.

Subsequently, the filtering section 38 uses the image filters 20 that have survived through the preceding generation and the newly generated image filters 20 from the step S12 to filter the to-be-converted image, thereby obtaining a plurality of to-be-selected images (step S13). In this manner, the filtering section 38 can generate a plurality of to-be-selected images corresponding to a plurality of image filters 20.

Subsequently, the filter selecting section 50 calculates the degree of similarity between each to-be-selected image and the target image, and selects a plurality of image filters 20 corresponding to a plurality of to-be-selected images having relatively high degrees of similarity (step S14). In the last generation, for example, the filter selecting section 50 may select a single image filter 20 corresponding to a single to-be-selected image having the highest degree of similarity.

Subsequently, the filter selecting section 50 allows the one or more image filters 20 selected in the step S14 to remain to the next generation and deletes the image filters 20 corresponding to the one or more to-be-selected images that are not selected in the step S14 (step S15). The image processing apparatus 10 repeats the above-described procedure over a plurality of generations (for example, several dozen or hundred generations), and stops performing the above-described procedure when completing the procedure for the N-th generation (N is an integer more than one) (step S16). In the above-described manner, the image processing apparatus 10 can generate an image filter 20 suitable for converting the to-be-converted image to the target image by using evolutionary computation.

Figure 9:
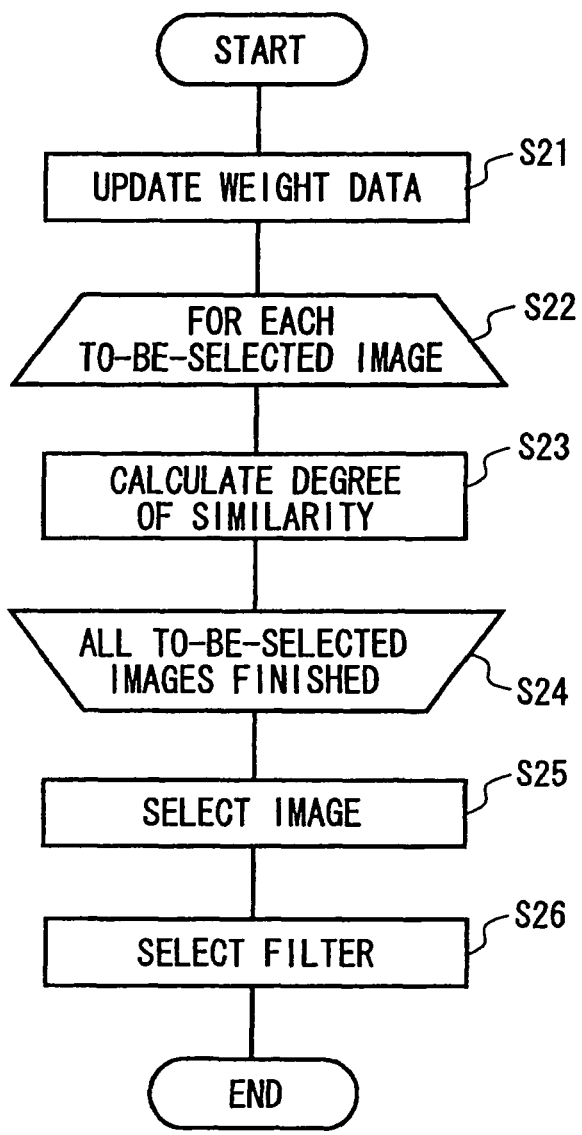
FIG. 9 is a flow chart illustrating exemplary operations performed by the image processing apparatus 10 in a step S14 of the flow chart in FIG. 8.

FIG. 9 is a flow chart illustrating exemplary operations performed by the image processing apparatus 10 in the step S14 of the flow chart in FIG. 8. In the step S14 of the flow chart in FIG. 8, the image processing apparatus 10 performs the following operations.

The weight generating section 44 automatically updates the weight assigning image for the purpose of generating an appropriate weight assigning image for each generation (step S21). How to generate a weight assigning image is described in detail later with reference to FIG. 10.

After this, the calculating section 46 performs the following step S23 for each of the to-be-selected images generated by using the image filters 20 stored on the filter storing section 32 (step S22, step S24). In the step S23, the calculating section 46 compares each to-be-selected image with the target image with the difference between these images being weighted in accordance with the weight assigning image, and calculates the degree of similarity between the to-be-selected image and the target image. The image processing apparatus 10 proceeds to the step S25 after the calculating section 46 completes the above comparison operation for all of the to-be-selected images (step S24).

After this, the image selecting section 48 selects, from among the to-be-selected images, one or more to-be-selected images that are more similar to the target image based on the degrees of similarity calculated for the to-be-selected images (step S25). For example, the image selecting section 48 may preferentially select one or more to-be-selected images having relatively high degrees of similarity, from among the to-be-selected images generated by using the image filters 20. For example, the image selecting section 48 may select one or more to-be-selected images that have degrees of similarity higher than a reference degree of similarity. For example, the image selecting section 48 may select one or more to-be-selected images whose degrees of similarity are ranked within a predetermined range from the top. For example, the image selecting section 48 may randomly select one or more to-be-selected images, under such a condition that a given to-be-selected image is more likely to be selected as its degree of similarity increases.

After this, the filter selecting section 50 selects one or more image filters 20 used to generate the to-be-selected images selected by the image selecting section 48, as one or more image filters 20 that can convert the to-be-converted image into images that are more similar to the target image (step S26). After the step S26, the image processing apparatus 10 ends the above flow of the steps.

Figure 10:
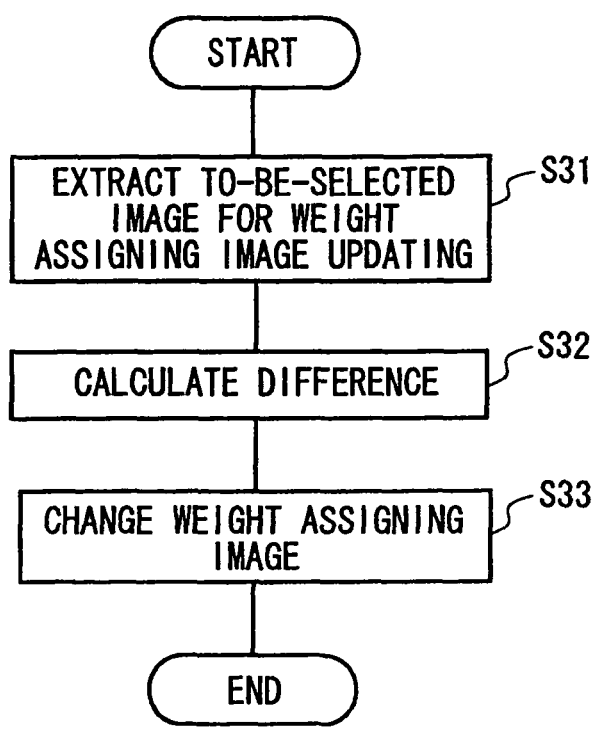
FIG. 10 is a flow chart illustrating exemplary operations performed by a weight generating section 44 in a step S21 of the flow chart in FIG. 9.

FIG. 10 is a flow chart illustrating exemplary operations performed by the weight generating section 44 in the step S21 of the flow chart in FIG. 9. The weight generating section 44 performs the following steps S31 to S33 in the weight assigning image updating operation in the step S21 of the flow chart in FIG. 9.

The weight updating section 62 of the weight generating section 44 extracts at least one to-be-selected image from the to-be-selected images generated by using the image filters 20 that have survived through the preceding generation and the newly generated image filters 20 from the step S12 in FIG. 8, as a to-be-selected image for the weight assigning image updating operation (step S31). For example, the weight updating section 62 may extract a to-be-selected image generated by using a given image filter 20 chosen from the image filters 20. For example, the weight updating section 62 may extract a to-be-selected image that is generated by using an image filter 20 associated with the highest degree of similarity in the preceding generation among the image filters 20. For example, the weight updating section 62 may extract one or more to-be-selected images generated by using one or more image filters 20 whose degrees of similarity are no less than a predetermined value in the preceding generation.

Subsequently, the weight updating section 62 calculates the difference, in each region, between the target image and the one or more to-be-selected images extracted in the step S31 for the weight assigning image updating operation (step S32). For example, the weight updating section 62 may calculate the difference, in each pixel, between the target image and the one or more to-be-selected images extracted for the weight assigning image updating operation. When extracting more than one to-be-selected image in the step S31, the weight updating section 62 may calculate the difference in each region (for example, in each pixel) between the target image and each of the to-be-selected images extracted for the weight assigning image updating operation and select the largest difference for each region (for example, for each pixel), for example.

After this, the weight updating section 62 changes the weight assigning image stored on the weight storing section 60, that is to say, the weight assigning image used in the preceding generation, in accordance with the difference calculated in association with each region in the step S32 (step S33). Specifically speaking, the weight updating section 62 updates the weight data stored on the weight storing section 60 in compliance with the principle that the weight of a given region is larger than the weight of a different region when the difference is larger in the given region than in the different region. In the first generation, the weight storing section 60 may store a weight assigning image generated in advance by a user, or store a weight assigning image in which each region has the same weight, for example.

Figure 11:
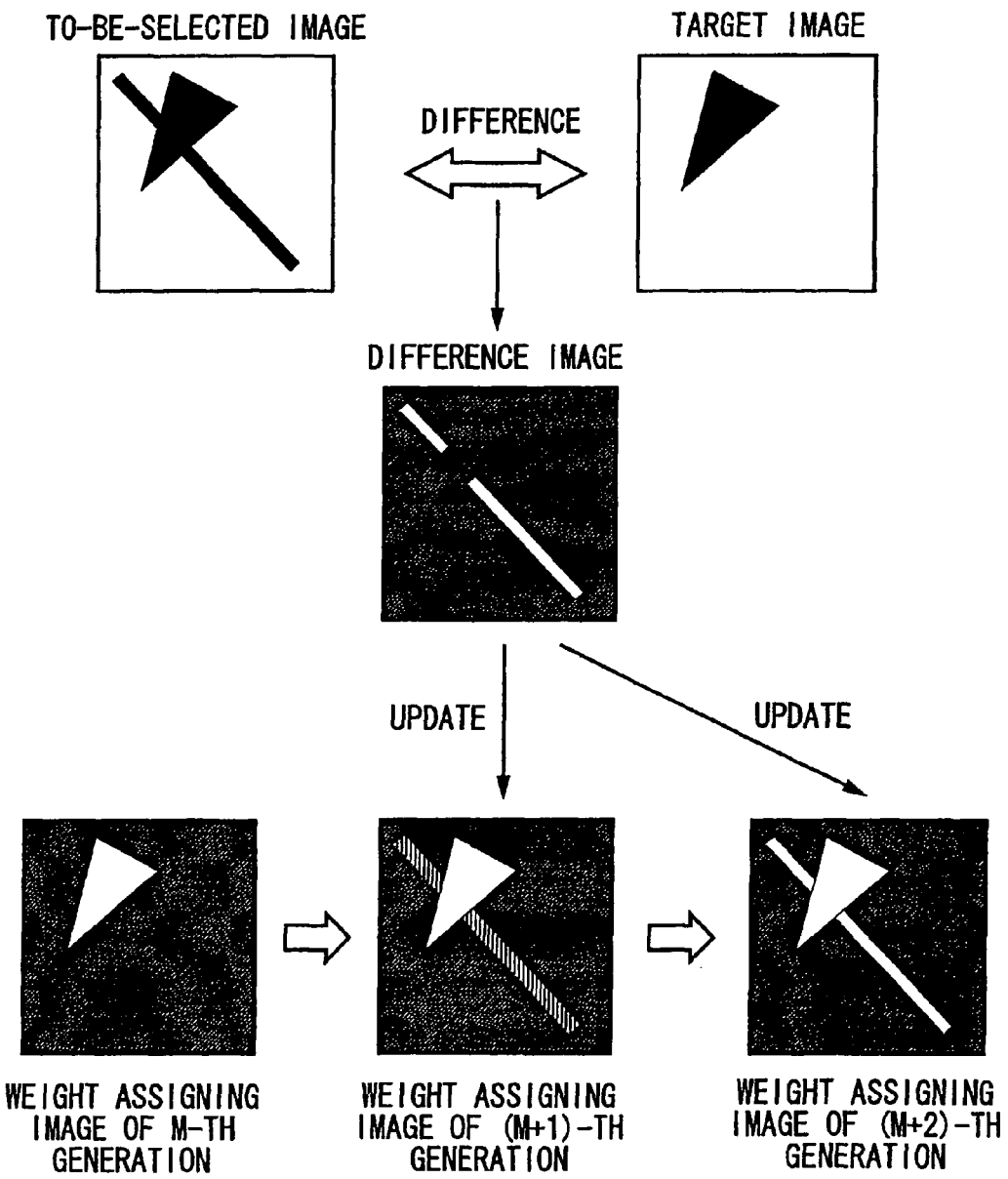
FIG. 11 illustrates an exemplary weight assigning image updated in each generation.

FIG. 11 illustrates an exemplary weight assigning image updated in each generation. As described with reference to FIG. 10, the weight generating section 44 can generate an appropriate weight assigning image for each generation.

As illustrated in FIG. 11, the weight generating section 44 may generate a difference image representing the difference in each pixel between a to-be-selected image and the target image, for example. The weight generating section 44 may then update the weight data by multiplying the generated difference image by a predetermined coefficient and adding the multiplication result to the weight assigning image stored on the weight storing section 60, for example. In this way, the weight generating section 44 can update the weight assigning image in such a manner that the weight of a given region is larger than the weight of a different region when the difference is larger in the given region than in the different region.

With the above-described configuration, the image processing apparatus 10 relating to the first embodiment can calculate the degree of similarity between each to-be-selected image and the target image with the difference between the to-be-selected image and the target image being weighted appropriately in each region of the image. As a result, the image processing apparatus 10 can appropriately select a to-be-selected image similar to the target image from among a plurality of to-be-selected images.

For example, in order to select one or more image filters 20 to survive to the next generation, the image processing apparatus 10 relating to the first embodiment selects one or more to-be-selected images similar to a target image from among a plurality of to-be-selected images generated by using a plurality of image filters 20. Here, the image processing apparatus 10 relating to the first embodiment uses weight data during the process of calculating the degree of similarity between the target image and each to-be-selected image. The image processing apparatus 10 relating to the first embodiment can update the weight data appropriately for each generation. For example, as the generations proceed, most of the to-be-selected images generated by using the image filters 20 are similar to the target image, that is to say, the to-be-selected images only slightly differ from each other. Even in such generations, the image processing apparatus 10 having the above-described configuration can appropriately distinguish one or more to-be-selected images that are more similar to the target image than the others. Consequently, the image processing apparatus 10 can generate an appropriate image filter 20 within a short period of time.

The first embodiment may be modified in the following manner, for example. Instead of generating the weight data based on the difference between a to-be-selected image and the target image, the weight generating section 44 may generate the weight data in such a manner that the weight of a given region is larger than a weight of a different region when a difference between any two or more of the to-be-selected images is larger in the given region than in the different region. For example, the weight generating section 44 may generate weight data in which the weight of a given region is larger than the weight of a different region when a difference between two of the to-be-selected images is larger in the given region than in the different region. More specifically, the weight generating section 44 may update the weight data by generating a difference image representing a difference in each pixel between a first to-be-selected image and a second to-be-selected image, multiplying the generated difference image by a predetermined coefficient, and adding the multiplication result to the weight assigning image stored on the weight storing section 60.

The image processing apparatus 10 relating to the above modification example can enhance the difference between to-be-selected images. Therefore, even when most of the to-be-selected images generated by the image filters 20 are similar to the target image and the to-be-selected images only slightly differ from each other as a result of certain times of alternation of generations, the image processing apparatus 10 can appropriately distinguish one or more to-be-selected images that are more similar to the target image. Consequently, the image processing apparatus 10 can generate an appropriate image filter 20 within a short period of time.

Figure 12:
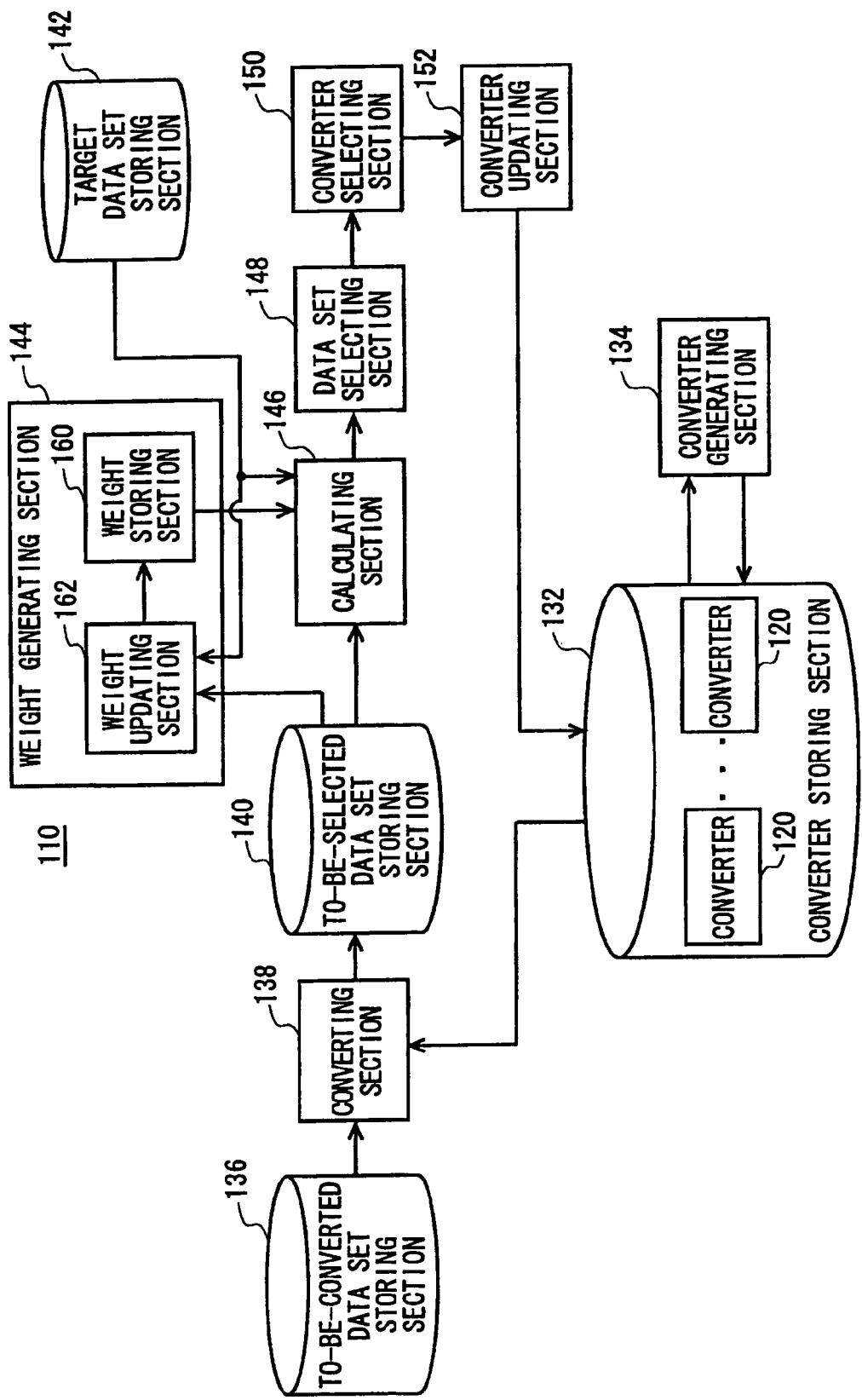
FIG. 12 illustrates the configuration of a processing apparatus 110 relating to a second embodiment.

FIG. 12 illustrates the configuration of a processing apparatus 110 relating to a second embodiment. The processing apparatus 110 is designed to generate a converter 120 for converting an input data set into a converted data set, where the data sets each includes a plurality of pieces of data. More specifically, the processing apparatus 110 uses evolutionary computation to generate a converter 120 that is suitable for converting a to-be-converted data set into a target data set, where the data sets each includes a plurality of pieces of data. The processing apparatus 110 is realized by using a computer, in one example.

Here, the data set to be converted by the converter 120 may be a one-dimensional data string, a two-dimensional data group, a three-dimensional data group, or any higher multi-dimensional data group. The one-dimensional data string may be, for example, time-series data or a string of data pieces arranged in time-series. The two-dimensional data group may be, for example, image data in which a plurality of pieces of pixel data are arranged in a two-dimensional space. The three-dimensional data group may be, for example, volume data in which data values representing colors or concentrations are arranged at grid points in a three-dimensional space. The dimension of the data set output from the converter 120 may be different from the dimension of the data set input into the converter 120.

When the input data set is image data, the converter 120 has the same configuration as the image filter 20 described in the first embodiment, and the processing apparatus 110 has the same configuration as the image processing apparatus 10 described in the first embodiment. In other words, the converter 120 may be an image filter that is configured to convert an input image including a plurality of pieces of pixel data into a converted image including a plurality of pieces of pixel data.

The converter 120 may be formed by combining together a plurality of converter parts, each of which converts an input data set including a plurality of pieces of input data into an output data set including a plurality of pieces of output data. For example, the converter 120 may have converter parts combined in series, similarly to the image filter 20 shown in FIG. 2. Alternatively, the converter 120 may have converter parts combined in a tree structure, similarly to the image filter 20 shown in FIG. 3. The converter 120 may be, for example, a program for performing operations on a data set, an arithmetic expression representing operations to be performed on a data set, or the like.

The processing apparatus 110 includes a converter storing section 132, a converter generating section 134, a to-be-converted data set storing section 136, a converting section 138, a to-be-selected data set storing section 140, a target data set storing section 142, a weight generating section 144, a calculating section 146, a data set selecting section 148, a converter selecting section 150, and a converter updating section 152. The converter storing section 132 stores a plurality of converters 120, which are generated in advance and different from each other.

The converter generating section 134 generates one or more converters 120 of the next generation from one or more converters 120 of the current generation. Specifically speaking, the converter generating section 134 performs genetic operators such as crossover and mutation to replace one or more converter parts constituting at least part of a converter 120 of the current generation, which is formed by combining together one or more converter parts, with one or more different converter parts, thereby newly generating a plurality of converters 120 of the next generation, similarly to the filter generating section 34 described in the first embodiment. For example, the converter generating section 134 may perform the genetic operators shown in FIGS. 4, 5 and 6 on the converters 120.

The to-be-converted data set storing section 136 stores a to-be-converted data set to be converted by the converters 120. For example, the to-be-converted data set storing section 136 may store a plurality of to-be-converted data sets.

The converting section 138 sequentially obtains the converters 120 stored on the converter storing section 132. The converting section 138 uses the obtained converters 120 to convert the to-be-converted data set, to generate a plurality of to-be-selected data sets.

The to-be-selected data set storing section 140 stores the to-be-selected data sets generated by the converting section 138. In one example, the to-be-selected data set storing section 140 stores each of the to-be-selected data sets generated at the converting section 138 by converting the to-be-converted data set using the converters 120, in association with the corresponding converter 120.

The target data set storing section 142 stores a target data set that is intended to be generated by converting the to-be-converted data set. For example, the target data set storing section 142 may store a plurality of target data sets.

The weight generating section 144 generates a weight data set including a plurality of pieces of weight data each of which represents a weight of a corresponding piece of data. The weight data set is used when a to-be-selected data set and the target data set are compared with each other. For example, the weight generating section 144 may generate a weight data set in which a plurality of pieces of data are arranged in the same manner as in the to-be-selected data set or the target data set.

Here, the weight generating section 144 generates the weight data set in which the weight of given data is larger than the weight of different data when the difference in terms of each piece of data between data sets is larger for the given data than for the different data, where the data sets forms at least one pair of data sets chosen from a plurality of to-be-selected data sets and the target data set. For example, the weight generating section 144 may generate a weight data set of the next generation by modifying a weight data set of the current generation in such a manner that a predetermined value is added to the weight of data whose difference is larger than a threshold value and a value smaller than the predetermined value is added to the weight of data whose difference is no more than the threshold value. For example, the weight generating section 144 may generate a weight data set of the next generation by modifying a weight data set of the current generation in such a manner that a predetermined value is added to the weight of data whose difference is larger than a threshold value and a predetermined value is subtracted from the weight of data whose difference is no more than the threshold value.

For example, the weight generating section 144 may include a weight storing section 160 and a weight updating section 162. The weight storing section 160 stores a weight data set. The weight updating section 162 updates the weight data set stored on the weight storing section 160, for example, in each generation in compliance with the principle that the weight of given data is larger than the weight of different data when the difference in each piece of data between the selected data sets is larger for the given data than for the different data. How to generate a weight data set is described in detail later.

The calculating section 146 calculates the degree of approximation between the target data set and each of two or more to-be-selected data sets with the difference in each piece of data between the target data set and each of the two or more to-be-selected data sets being weighted in accordance with the weight data set. The degree of approximation is an exemplary parameter indicative of the degree of suitability of a converter 120, and is used as an evaluation value or index whose value increases as the converter 120 used to generate a corresponding to-be-selected data set becomes more suitable. When the to-be-selected data set and the target data set are image data, the calculating section 146 may calculate the degree of similarity between the to-be-selected data set and the weight data set, similarly to the calculating section 46 relating to the first embodiment. The data set selecting section 148 selects, from two or more to-be-selected data sets, one or more to-be-selected data sets that are more approximate to the target data set, by referring to the respective degrees of approximation of the two or more to-be-selected data sets.

The converter selecting section 150 selects one or more converters 120 that outputs the to-be-selected data sets selected by the data set selecting section 148, as one or more converters 120 that convert the to-be-converted data set into data sets more approximate to the target data set. Specifically speaking, the converter selecting section 150 selects one or more converters 120 by using a technique modeling organism selection from among the converters 120 stored on the converter storing section 132. For example, the converter selecting section 150 may select one or more converters 120 from a plurality of converters 120 of the current generation in the descending order of the degrees of approximation of the corresponding to-be-selected data sets, as one or more converters 120 of the next generation (elite strategy). For example, the converter selecting section 150 may select a converter 120 that is associated with the highest degree of approximation as a converter 120 of the next generation. For example, the converter selecting section 150 may randomly select one or more converters 120 from converters 120 of the current generation that are associated with to-be-selected data sets whose degrees of approximation are no less than a predetermined value, as one or more converters 120 of the next generation (roulette wheel selection).

The converter updating section 152 updates the converters 120 stored on the converter storing section 132 with the converters 120 selected by the converter selecting section 150. Specifically speaking, the converter updating section 152 may allow the selected converters 120 to remain in the converter storing section 132 and delete the not-selected converters 120 from the converter storing section 132, so that the selected converters 120 survive to the next generation and the not-selected converters 120 perish in the current generation.

Figure 13:
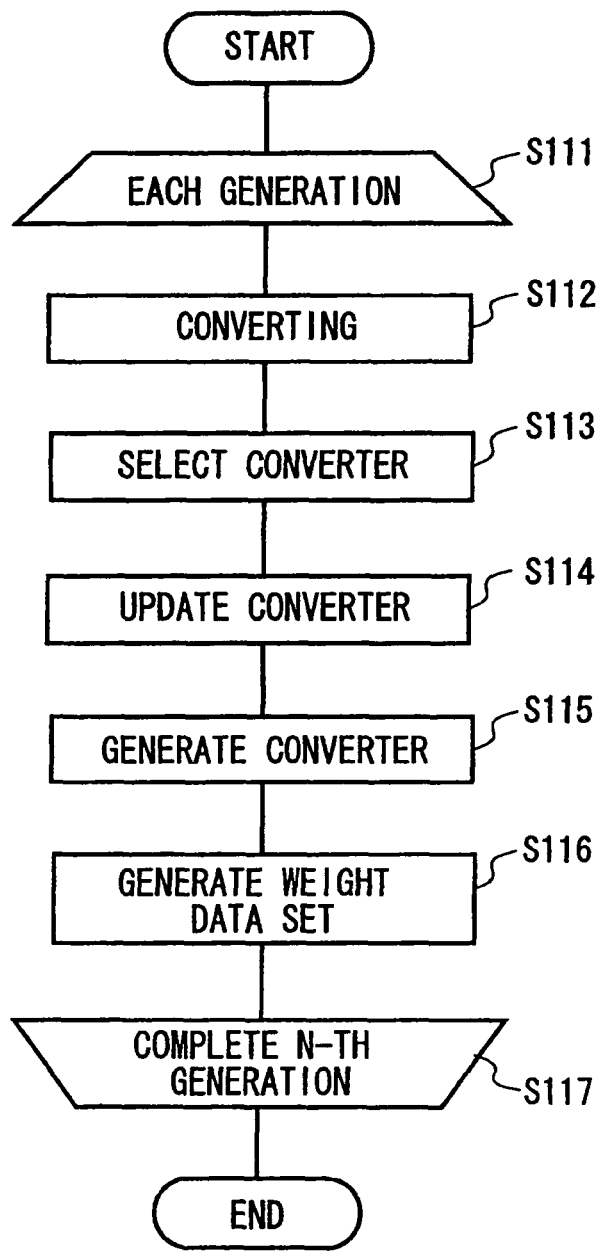
FIG. 13 is a flow chart illustrating the operations performed by the processing apparatus 110.

FIG. 13 is a flow chart illustrating the operations performed by the processing apparatus 110. The processing apparatus 110 repeats the procedure of the steps S112 to S116 multiple times (for example, over multiple generations) (step S111, step S117).

The converting section 138 uses the converters 120 of the current generation stored on the converter storing section 132 to convert the to-be-converted data set and thus generate to-be-selected data sets (step S112). In this manner, the converting section 138 can generate a plurality of to-be-selected data sets corresponding to a plurality of converters 120.

Subsequently, the converter selecting section 150 calculates the degree of approximation between the target data set and each of the to-be-selected data sets with the difference between the target data set and the to-be-selected data set being weighted in accordance with the weight data set, and selects one or more converters 120 corresponding to one or more to-be-selected data sets that have higher degrees of approximation (step S113). In the last generation, for example, the converter selecting section 150 may select a single converter 120 corresponding to a single to-be-selected data set having the highest degree of approximation.

Subsequently, the converter updating section 152 allows the converters 120 selected in the step S113 to survive to the next generation and deletes one or more converters 120 that are not selected in the step S113 (step S114). After this, the converter generating section 134 performs genetic operators such as crossover and mutation on the survived converters 120, thereby generating one or more new converters 120 (step S115). The converter generating section 134 stores the survived converters 120 and the new converters 120 onto the converter storing section 132 as converters 120 of the next generation. In the last generation, the converter generating section 134 may not need to perform this step.

Subsequently, the weight generating section 144 generates a new weight data set for the next generation, for the purpose of generating an appropriate weight data set for each generation (step S116). How to generate the weight data set is described in detail later. In the last generation, the weight generating section 144 may not need to perform this step.

The processing apparatus 110 repeats the above-described procedure over a plurality of generations (for example, several dozen or hundred generations), and stops performing the above-described flow when completing the last generation (the N-th generation and N is an integer more than one) (step S117). In the above-described manner, the processing apparatus 110 can generate a converter 120 suitable for converting the to-be-converted data set to the target data set by using evolutionary computation.

Figure 14:
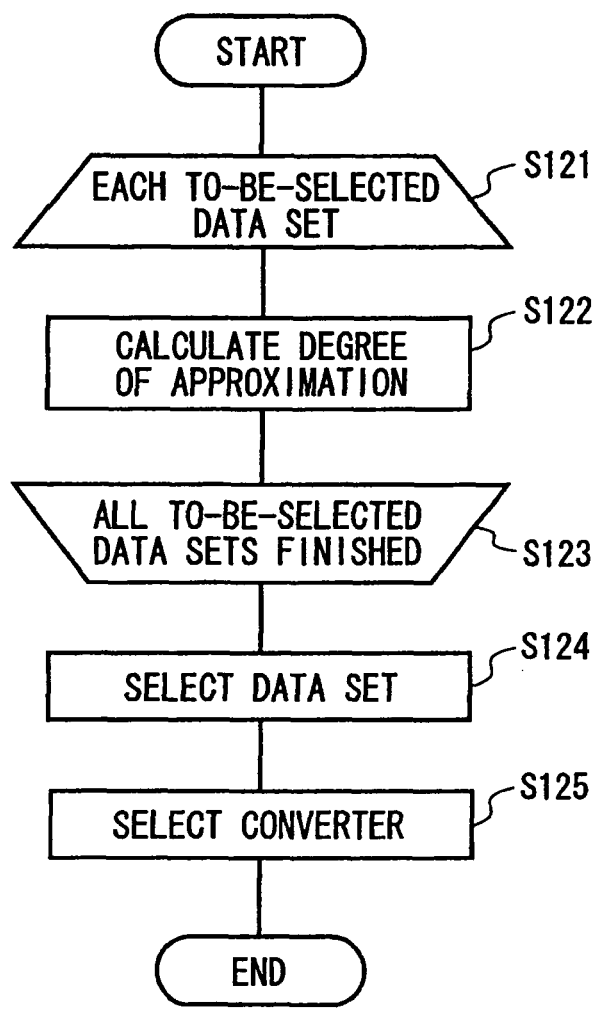
FIG. 14 is a flow chart illustrating exemplary operations performed by the processing apparatus 110 in a step S113 of the flow chart in FIG. 13.

FIG. 14 is a flow chart illustrating exemplary operations performed by the processing apparatus 110 in the step S113 of the flow chart in FIG. 13. In the step S113 of the flow chart in FIG. 13, the processing apparatus 110 performs the following operations.

The calculating section 146 performs a step S122 described in the following for each of a plurality of to-be-selected data sets generated by using a plurality of converters 120 of the current generation (step S121, step S123). In a step S122, the calculating section 146 compares each to-be-selected data set with the target data set with the difference between the to-be-selected data set and the target data set being weighted in accordance with the weight data set, and calculates the degree of approximation between the target data set and the to-be-selected data set. The processing apparatus 110 proceeds to a step S124 after the calculating section 146 completes the calculation for all of the to-be-selected data sets (step S123).

Subsequently, the data set selecting section 148 selects, from the to-be-selected data sets, one or more to-be-selected data sets that are more approximate to the target data set, by referring to the degrees of approximation of the to-be-selected data sets (step S124). For example, the data set selecting section 148 may preferentially select one or more to-be-selected data sets that have higher degrees of approximation, from among the to-be-selected data sets generated by using the converters 120. For example, the data set selecting section 148 may select one or more to-be-selected data sets whose degrees of approximation are higher than a reference degree of approximation. For example, the data set selecting section 148 may select one or more to-be-selected data sets whose degrees of approximation are ranked in a predetermined range from the top. For example, the data set selecting section 148 may randomly select one or more to-be-selected data sets, under such a condition that a to-be-selected data set is more likely to be selected as the degree of approximation of the to-be-selected data set increases.

Subsequently, the converter selecting section 150 selects one or more converters 120 used to generate the to-be-selected data sets selected by the data set selecting section 148 as one or more converters 120 that can convert the to-be-converted data set into an image that is more approximate to the target data set (step S125). After the step S125, the processing apparatus 110 terminates the above flow of steps.

Figure 15:
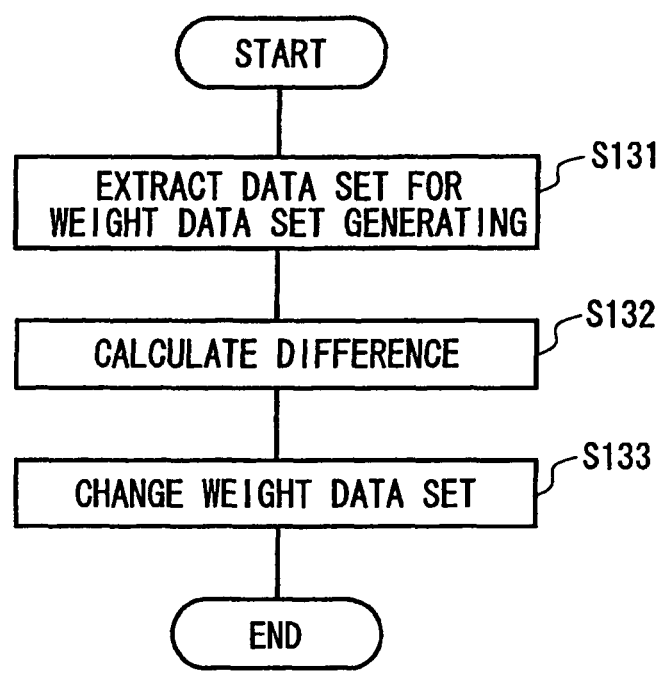
FIG. 15 is a flow chart illustrating exemplary operations performed by the weight generating section 144 in a step S116 of the flow chart in FIG. 13.

FIG. 15 is a flow chart illustrating exemplary operations performed by the weight generating section 144 in the step S116 of the flow chart in FIG. 13. The weight generating section 144 performs the following steps S131 to S133 in the weight data set generating operation in the step S116 shown in FIG. 13. To begin with, the weight generating section 144 extracts at least one pair of data sets from the target data set and the to-be-selected data sets output from the converters 120, for the weight data set generating operation (step S131).

Subsequently, the weight generating section 144 calculates a difference in each piece of data between the data sets extracted in the step S131 for the weight data set generating operation (step S132). The weight generating section 144 calculates a difference between data at a given position in one of the extracted data sets and data at a corresponding position in the other of the extracted data sets. For example, when the extracted pair of data sets is a pair of three-dimensional data groups, the weight generating section 144 may calculate a difference between pieces of data located at grid points corresponding to each other. The weight generating section 144 may provide, as such a difference, the absolute value of a result of subtracting one piece of data from another piece of data.

When a plurality of pairs of data sets are extracted in the step S131, the weight generating section 144 may calculate a difference between data sets forming each pair, and calculate a sum or average of the differences in association with each piece of data (for example, in association with each grid point in the case of three-dimensional data groups). Alternatively, the weight generating section 144 may select, for each piece of data, the largest difference among the differences calculated for the plurality of pairs of data sets.

Subsequently, the weight generating section 144 generates a weight data set for the next generation based on the difference calculated in the step S132 for each piece of data (step S133). More specifically, the weight generating section 144 generates the weight data set of the next generation in which the weight of given data is larger than the weight of different data when the difference calculated for each piece of data is larger for the given data than for the different data. In the first generation, for example, the weight generating section 144 may store a weight data set generated by a user in advance or a weight data set in which each piece of data has the same weight.

Here, the weight generating section 144 generates the weight data set of the next generation based on at least one pair of data sets that are extracted in the step S131 from the target data set and one or more to-be-selected data sets output from one or more converters 120 of the current and preceding generations.

For example, the weight generating section 144 may extract a pair of the target data set and each of one or more to-be-selected data sets selected in the descending order of the degree of approximation in each of the current and preceding generations. In other words, the weight generating section 144 extracts a pair of a to-be-selected data set and a target data set for each of the current and preceding generations.

For example, the weight generating section 144 may extract two to-be-selected data sets in the descending order of the degree of approximation in each of the current and preceding generations. In other words, the weight generating section 144 extracts a pair of two different to-be-selected data sets for each of the current and preceding generations.

For example, the weight generating section 144 may extract a pair of a target data set and each of one or more to-be-selected data sets selected in the descending order of the degree of approximation in each of the current and one or more preceding generations, and a pair of two to-be-selected data sets selected in the descending order of the degree of approximation in each of the current and one or more preceding generations. In other words, the weight generating section 144 extracts a pair of the target data set and a to-be-selected data set and a pair of two different to-be-selected data sets for each of the current and one or more preceding generations.

The weight generating section 144 calculates a per-data difference between the data sets for each of the pairs extracted in the above manner. The weight generating section 144 generates the weight data set of the next generation based on the per-data differences calculated for the individual pairs. In this manner, the calculating section 146 can calculate the degree of approximation for each of the two or more to-be-selected data sets output from two or more converters 120 of the next generation, with the per-data difference between the target data set and the to-be-selected data set being weighted in accordance with the weight data set of the next generation.

The processing apparatus 110 relating to the second embodiment can calculate the degree of approximation between a to-be-selected data set and the target data set with the difference between the to-be-selected data set and the target data set being appropriately weighted in accordance with the weight data set. In this manner, the processing apparatus 110 can select an appropriate to-be-selected data set that is approximate to the target data set, from among a plurality of to-be-selected data sets.

The processing apparatus 110 generates the weight data set for the next generation by using one or more to-be-selected data sets generated in the current and one or more preceding generations. With such a configuration, the processing apparatus 110 can avoid the case where the same weight data set is periodically and repeatedly generated, and instead stably generate an appropriate weight data set for a long period of time.

Figure 16:
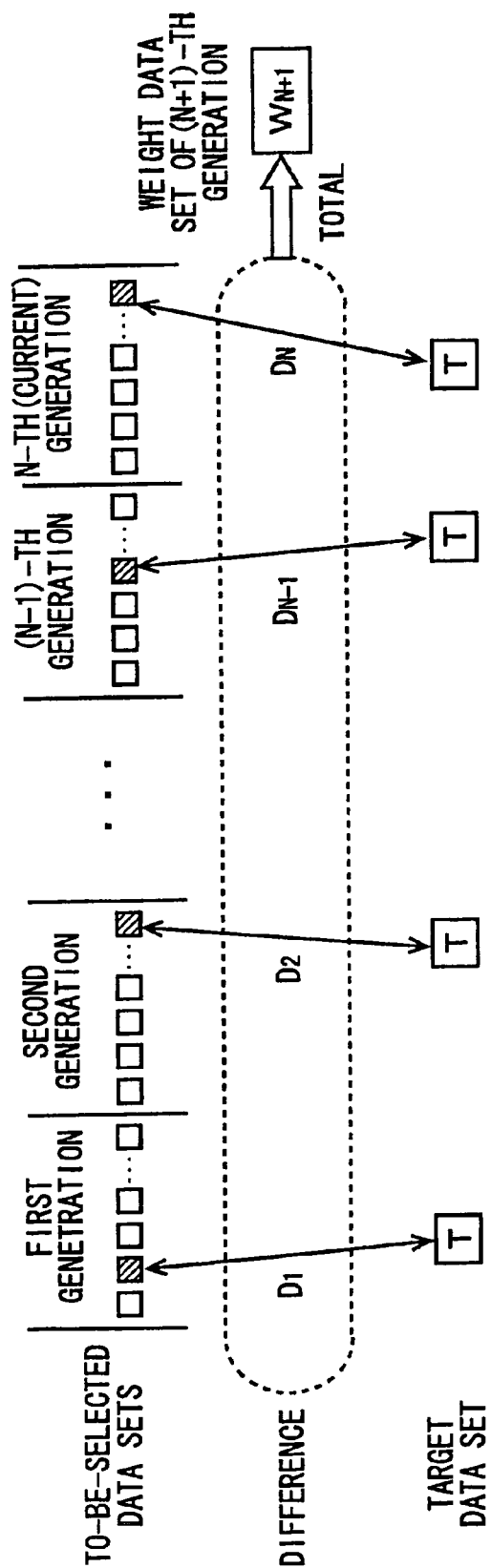
FIG. 16 illustrates an exemplary weight data set generating operation.

FIG. 16 illustrates an exemplary weight data set generating operation. For example, the weight generating section 144 may generate the weight data set of the next generation that is a monotonically nondecreasing function of the total obtained by adding together the per-data difference between the target data set and each of one or more to-be-selected data sets selected in the descending order of the degree of approximation in each of the current and preceding generations. With such a configuration, the weight generating section 144 can stably generate an appropriate weight data set for a long period of time.

For example, the weight generating section 144 may generate the weight data set by using the arithmetic expression expressed by the following Expression 11.

$$W_{N+1,M} = F\left(\frac{1}{N} \cdot \left(\sum_{K=1}^{N} D_{K,M}\right)\right) \tag{11}$$

In Expression 11, $W_{N+1,M}$ denotes the value of the M-th (M is an integer equal to or larger than 1) weight data included in a weight data set for (N+1)-th generation (N is an integer equal to or larger than 1). In Expression 11, F(X) represents a monotonically nondecreasing function having X as its variable. In other words, when the variable X increases, F(X) at least does not decrease. Alternatively, F(X) may be a monotonically increasing function. Note that the values of F(X) and X fall within a range within which pieces of data in data sets can vary.

In Expression 11, $D_{K,M}$ is expressed by the following Expression 12, in other words, represents the absolute value of the difference between the M-th value ($P_{K,M}$) in a to-be-selected data set selected in the K-th generation (K is an integer) and the M-th value ($T_M$) in the target data set.

$$D_{K,M} = |P_{K,M} - T_M| \tag{12}$$

As indicated by Expression 11, the weight generating section 144 may calculate a per-data difference between the target data set and each of one or more to-be-selected data sets selected in the descending order of the degree of approximation in each of the current and preceding generations. Subsequently, the weight generating section 144 may calculate a total of the calculated per-data differences, and divide the total by the number of generations up to the current generation. The weight generating section 144 may then generate the weight data set of the next generation including values obtained by level-converting the quotients for all pieces of data based on a predetermined monotonically nondecreasing function. In this manner, the weight generating section 144 can stably generate an appropriate weight data set for a long period of time.

For example, the monotonically nondecreasing function F(X) in Expression 11 may be a function expressed by the following Expression 13. According to the function indicated by the following Expression 13, the weight data varies significantly in the region where the difference value is small and varies slightly in the region where the difference value is large. By using such a function, the weight generating section 144 can vary the weight sensitively in the region where the difference value is small.

$$F(x) = 1 - \exp(-x) \tag{13}$$

For example, the monotonically nondecreasing function F(X) in Expression 11 may be a function according to which the weight data varies slightly in the region where the difference value is small and varies significantly in the region where the difference value is large. By using such a function, the weight generating section 144 can vary the weight sensitively in the region where the difference value is large.

For example, the weight generating section 144 may generate the weight data set of the next generation that is a monotonically nondecreasing function of the total obtained by adding together the per-data difference between the target data set and each of one or more to-be-selected data sets selected in the descending order of the degree of approximation in each of one or more generations including the current and preceding generations with the per-data difference being weighted in accordance with the generation of the converter 120 used to output the corresponding to-be-selected data set. With such a configuration, the weight generating section 144 can increase the influence of the difference associated with an influential generation on the weight data set.

For example, the weight generating section 144 may generate the weight data set based on the arithmetic expression indicated by the following Expression 14. In Expression 14, $W_K$ denotes the weight assigned to the difference associated with the K-th generation. Except for $W_K$, all the parameters in Expression 14 are the same as in Expression 11.

$$W_{N+1,M} = F\left(\frac{1}{N} \cdot \left(\sum_{K=1}^{N} D_{K,M} \cdot W_K\right)\right) \tag{14}$$

As indicated by Expression 14, the weight generating section 144 may calculate a per-data difference between the target data set and each of one or more to-be-selected data sets selected in the descending order of the degree of approximation in each of the current and preceding generations. After this, the weight generating section 144 may multiply the differences calculated for the individual generations by weights determined in advance for the individual generations, calculate a total of the multiplied per-data differences, and divide the per-data total by the number of the generations up to the current generation. The weight generating section 144 may then generate the weight data set of the next generation including values obtained by level-converting the quotients for all pieces of data based on a predetermined monotonically nondecreasing function. In this manner, the weight generating section 144 can stably generate an appropriate weight data set for a long period of time.

When calculating the total, the weight generating section 144 may increase the weight of a generation as the generation proceeds towards the current generation and decrease the weight of the generation as the generation moves away from the current generation, for example. When a plurality of to-be-selected data sets are selected in one generation, the weight generating section 144 may rank the to-be-selected data sets in the descending order of the degree of approximation within the single generation and assign weights to the to-be-selected data sets within the single generation in accordance with their ranks.

Figure 17:
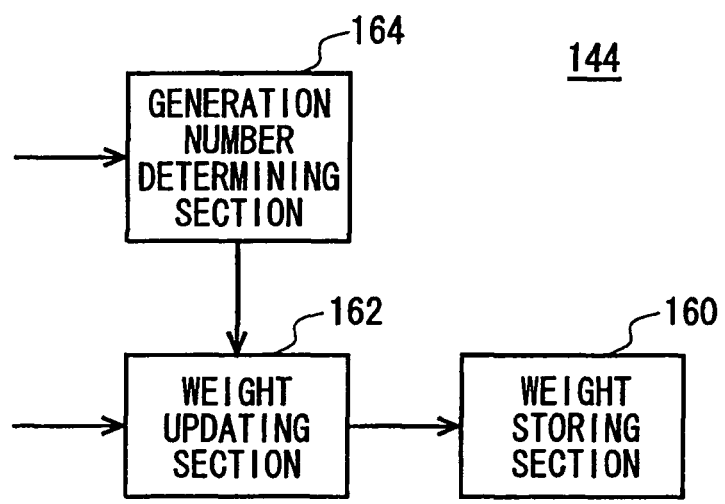
FIG. 17 illustrates an exemplary configuration of the weight generating section 144.

FIG. 17 illustrates an exemplary configuration of the weight generating section 144. For example, the weight generating section 144 may further include a generation number determining section 164. The generation number determining section 164 specifies the number of generations that are used by the weight generating section 144 to generate the weight data set of the next generation in each generation. With such a configuration, the weight generating section 144 can generate the weight data set of the next generation that is a monotonically nondecreasing function of the total of the per-data difference between the target data set and each of one or more to-be-selected data sets selected in the descending order of the degree of approximation in each of a predetermined number of generations including the current and preceding generations.

For example, the generation number determining section 164 may specify each of a predetermined number of generations including the current and preceding generations. In this case, the weight generating section 144 can generate the weight data set without considering very old generations that have limited influences. As a result, the weight generating section 144 can generate an appropriate weight data set with a reduced amount of operations.

For example, the weight generating section 144 may generate the weight data set by using the arithmetic expression indicated by the following Expression 15. In Expression 15, L denotes the number of generations specified by the generation number determining section 164. Except for L, all the parameters in Expression 15 are the same as in Expression 14.

$$W_{N+1,N} = F\left(\frac{1}{L} \cdot \left(\sum_{K=N-L}^{N} D_{K,M} \cdot W_K\right)\right) \tag{15}$$

As indicated by Expression 15, the weight generating section 144 may calculate a per-data difference between the target data set and each of one or more to-be-selected data sets selected in the descending order of the degree of approximation in each of a predetermined number of generations including the current and preceding generations. Subsequently, the weight generating section 144 may multiply the per-data difference calculated for each generation by a predetermined weight determined for the generation, calculate a total of the multiplied per-data differences, and divides the per-data total by the number of the generations up to the current generation. The weight generating section 144 may then generate the weight data set of the next generation including the values obtained by level-converting the quotients for all pieces of data based on a predetermined monotonically nondecreasing function. In this manner, the weight generating section 144 can stably generate an appropriate weight data set for a long period of time with a reduced amount of operations.

For example, the generation number determining section 164 may determine the number of generations used by the weight generating section 144 to generate the weight data set of the next generation in each generation, according to the change in the maximum degree of approximation between generations. For example, the generation number determining section 164 may decrease the number of generations used to generate the weight data set of the next generation as the change in the maximum degree of approximation between generations increases, and may increase the number of generations used to generate the weight data set of the next generation as the change in the maximum degree of approximation between generations decreases. For example, the generation number determining section 164 may determine the number of generations according to the value in proportion to the inverse of the change in the degree of approximation. With such a configuration, the generation number determining section 164 can increase the number of generations used to generate the weight data set of the next generation as the degree of approximation between the to-be-selected data sets generated by using image filters 20 and the target data set increases as a result of certain times of generation alternation.

For example, the weight generating section 144 may update the weight data set of the current generation, based on the per-data difference between the target data set and each of one or more to-be-selected data sets selected in the descending order of the degree of approximation in the current generation, to generate the weight data set of the next generation. With such a configuration, the weight generating section 144 does not use to-be-selected data sets generated in the past generations, and thus can generate the weight data set of the next generation with a reduced amount of operations. Furthermore, the weight generating section 144 having such a configuration does not need to store to-be-selected data sets generated in the past generations. Therefore, a memory can be reduced.

For example, the weight generating section 144 may generate the weight data set by using the arithmetic expression indicated by the following Expression 16.

$$W_{N+1,M} = W_{N,M} + \alpha(D_{N,M} - C) \tag{16}$$

In Expression 16, a denotes a predetermined coefficient, C denotes a predetermined reference value, and $W_{N, M}$ represents the value of the M-th weight data in the weight data set of the N-th generation. Except for a, C and $W_{N, M}$, all the parameters in Expression 16 are the same as in Expression 11. The value of $W_{N+1, M}$ in Expression 16 does not exceed the maximum available value of weight data, and does not fall below the minimum available value of weight data.

As indicated by Expression 16, the weight generating section 144 may generate the weight data set of the next generation by calculating the per-data difference between the target data set and each of one or more to-be-selected data sets selected in the descending order of the degree of approximation in the current generation, obtaining a difference data set by subtracting a predetermined reference value from the differences calculated for the individual pieces of data, multiplying the difference data set by a predetermined coefficient, and adding the multiplied data set to the weight data set of the current generation. With such a configuration, the weight generating section 144 can reduce the amount of operations required to generate the weight data set of the next generation. Furthermore, a memory can be reduced.

The parameter C in Expression 16 may take a small value relative to the data range of the weight data $W_{N, M}$. For example, when the weight data takes a value ranging from 0 to 255, C may take a value of approximately 10, for example. The parameter C in Expression 16 may vary as the generation changes. For example, the value of C may decrease as the generation proceeds. Also, the parameter C in Expression 16 may vary as the generation changes.

Figure 18:
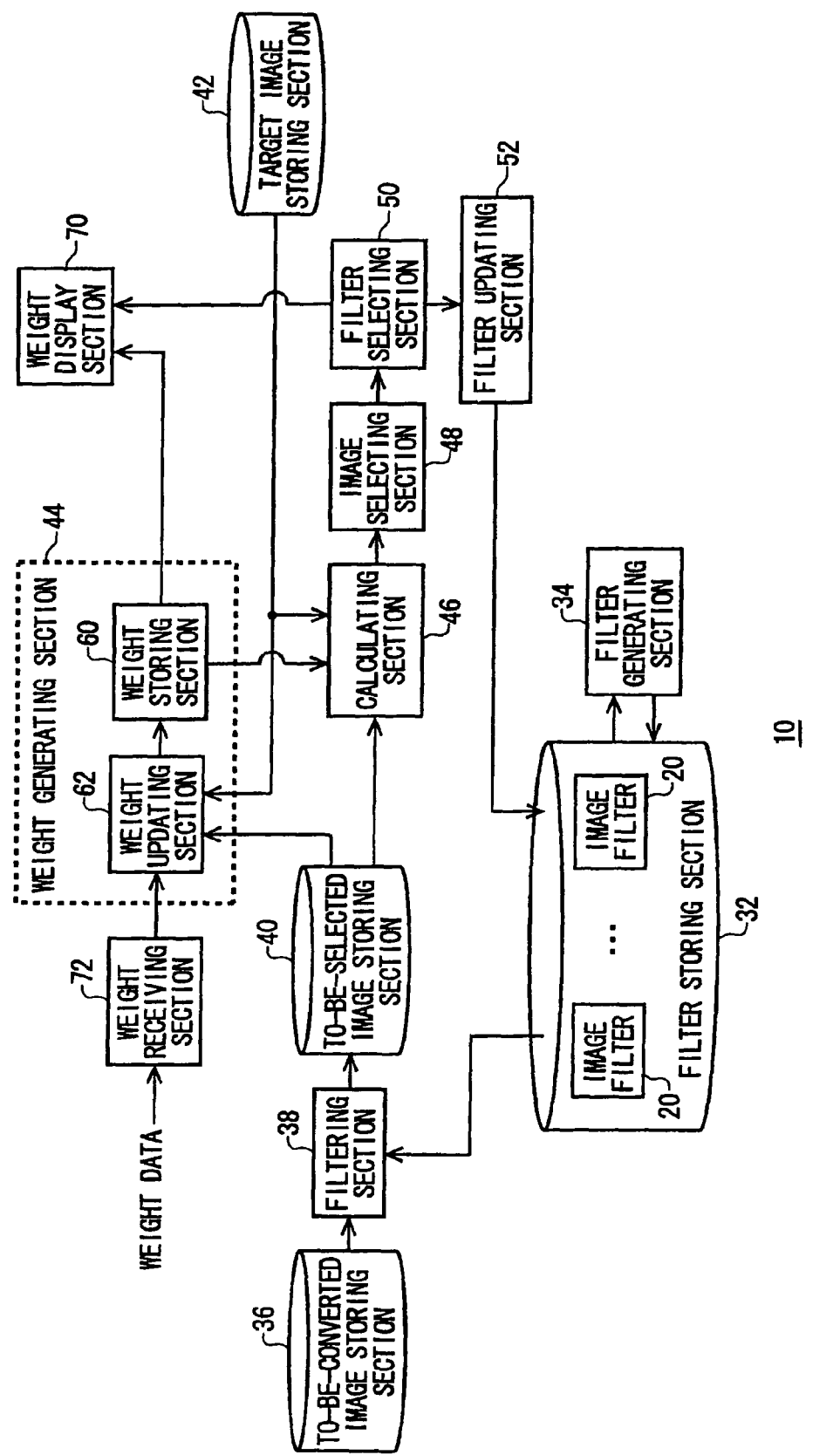
FIG. 18 illustrates the configuration of the image processing apparatus 10 relating to a first modification example that is a modification example of the first embodiment.

FIG. 18 illustrates the configuration of the image processing apparatus 10 relating to a first modification example that is a modification example of the first embodiment. The image processing apparatus 10 relating to the first modification example has substantially the same configuration and functions as the image processing apparatus 10 relating to the first embodiment described with reference to FIGS. 1 to 11. Therefore, the constituents having substantially the same configuration and functions as the corresponding constituents of the image processing apparatus 10 described with reference to FIGS. 1 to 11 are assigned the same reference numerals as in FIGS. 1 to 11. The following only describes the differences.

The image processing apparatus 10 relating to the first modification example additionally includes a weight display section 70 and a weight receiving section 72. In the first modification example, the weight updating section 62 in the weight generating section 44 updates the weight data in each generation, for example. In the first modification example, every time the weight updating section 62 updates the weight data, the weight storing section 60 may store the old weight data and the updated new weight data separately, for example.

The weight display section 70 displays the weight assigning image representing the weight assigned to each region in the image in accordance with the weight data stored on the weight storing section 60. For example, in response to the updating of the weight data stored on the weight storing section 60, the weight display section 70 obtains and displays the updated weight data.

For example, the weight display section 70 may display the weight assigning image in such a manner that the weights, which are assigned to the individual regions in the image, are shown by different colors depending on their values. The weight display section 70 may display the weight assigning image in such a manner that only the regions whose weights are equal to or higher than a predetermined level are enhanced. For example, the weight display section 70 may be a display device such as an LCD. As an alternative example, the weight display section 70 may be a drawing device such as a printer that outputs the weight assigning image in the printed form.

For example, the weight display section 70 may obtain weight data used in the preceding generation from the weight storing section 60 and display the obtained weight data in the form of a weight assigning image, together with the weight assigning image displayed in accordance with the weight data used in the current generation. As an alternative example, the weight display section 70 may display an image emphasizing the difference between the weight assigning image corresponding to the weight data of the current generation and the weight assigning image corresponding to the weight data of the preceding generation, with or without the weight assigning image of the current generation according to a selection made by the user.

The weight receiving section 72 receives weight data from a user. For example, on reception of weight data from the user, the weight receiving section 72 may update the weight data stored on the weight storing section 60 to the weight data received from the user. The weight receiving section 72 may cause the weight updating section 62 to update the weight data stored on the weight storing section 60.

As an alternative example, the weight receiving section 72 receives correction made by the user to the weight data corresponding to the weight assigning image displayed on the weight display section 70. When the user checks the weight assigning image displayed on the weight display section 70 and inputs corrected weight data, for example, the weight receiving section 72 may update the weight data stored on the weight storing section 64 to the weight data received from the user.

When receiving from the user weight data corresponding to one of the past generations in the image processing apparatus 10 relating to the first modification example, the weight receiving section 72 returns the state of the filter storing section 32 back to a state of storing image filters 20 corresponding to that past generation, and causes the filter generating section 34, the filtering section 38, the calculating section 46, the image selecting section 48, the filter selecting section 50, and the filter updating section 52 to restart their corresponding operations from that past generation.

Figure 19:
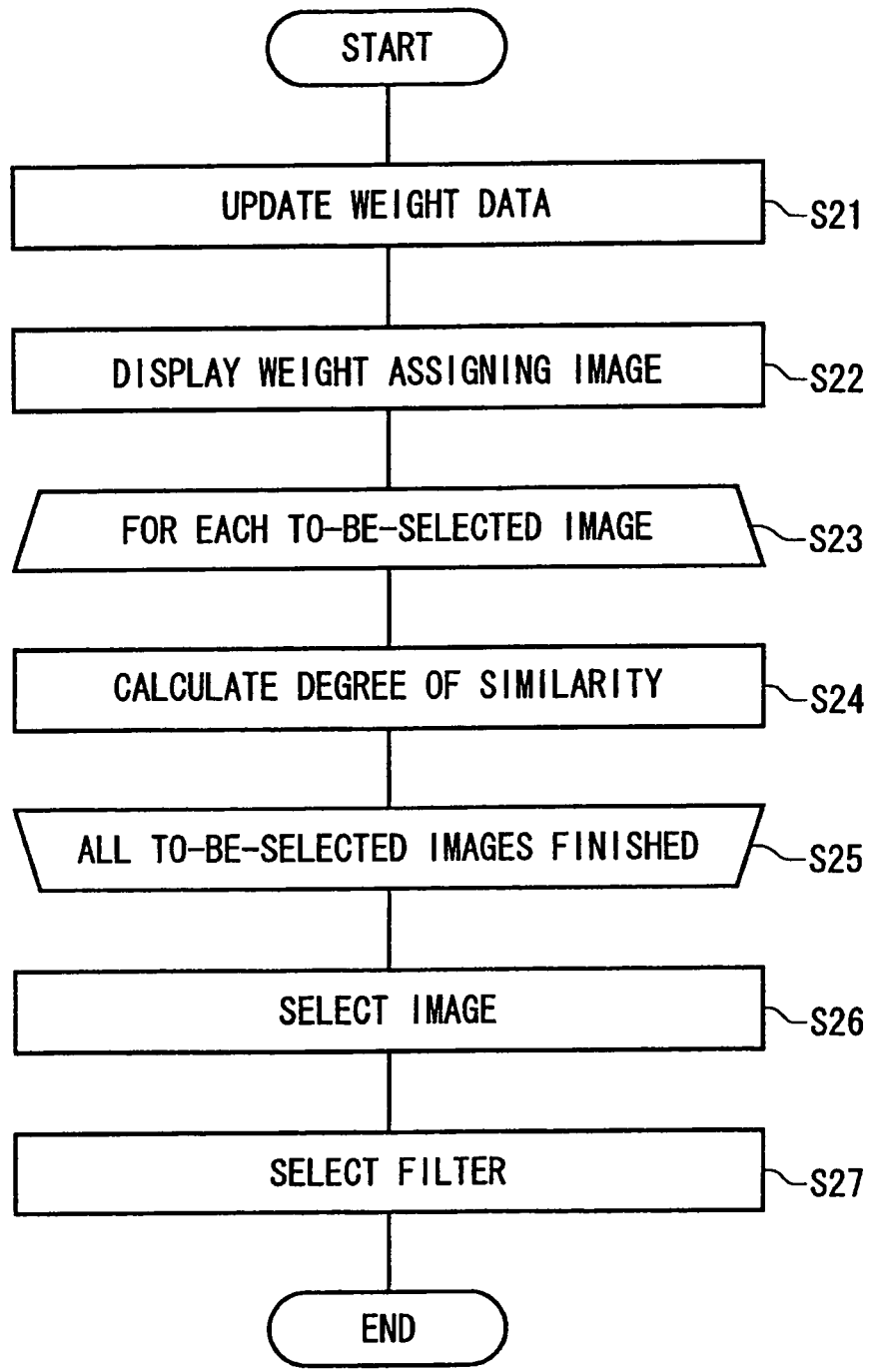
FIG. 19 is a flow chart illustrating exemplary operations performed by the image processing apparatus 10 relating to the first modification example to select image filters 20 in the step S14.

FIG. 19 is a flow chart illustrating exemplary operations performed by the image processing apparatus 10 relating to the first modification example in the step S14 of the flow chart in FIG. 8 to select the image filters 20. The image processing apparatus 10 relating to the first modification example performs the following operations in the step S14 of the flow chart in FIG. 8.

The weight generating section 44 automatically updates the weight assigning image, which is shown as an example of the weight data, in order that the degree of similarity between the target image and each to-be-selected image can be appropriately calculated with the difference between the target image and each to-be-selected image being weighted in each region in accordance with the weight assigning image (step S21). The weight generating section 44 may update the weight assigning image as described with reference to FIG. 10, for example.

In the first generation, the weight storing section 60 may store a weight assigning image generated in advance by the user, or store a weight assigning image in which each region has the same weight, for example. The weight assigning image updating operation performed by the weight generating section 44 in the step S21 of the flow chart in FIG. 19 may be performed in accordance with the weight assigning image received from the user at the weight receiving section 72, in place of the procedure illustrated in FIG. 10.

In this case, for example, the user increases or decreases the weights assigned to the individual regions as appropriate based on the weight assigning image displayed on the weight display section 70, and inputs the corrected weight assigning image into the weight receiving section 72. The user may input, into the weight receiving section 72, numerical values representing the regions to be corrected, the amounts of correction made to the weights, or the like. The weight receiving section 72 may cause the weight updating section 62 to update the weight assigning image stored on the weight storing section 60 in accordance with such input information received from the user.

After the weight assigning image is updated, the weight display section 70 obtains the updated weight assigning image from the weight generating section 44 and displays the obtained weight assigning image (step S22). The calculating section 46 performs the following step S24 for each of the to-be-selected images generated by using the image filters 20 stored on the filter storing section 32 (step S23, step S25). In the step S24, the calculating section 46 compares each to-be-selected image with the target image with the difference between the to-be-selected image and the target image being weighted in accordance with the weight assigning image, to calculate the degree of similarity between the to-be-selected image and the target image. After the calculating section 46 finishes the degree of similarity calculation for all of the to-be-selected images, the image processing apparatus 10 relating to the first modification example proceeds to the step S26 (step S25).

After this, the image selecting section 48 selects, from among the to-be-selected images, one or more to-be-selected images that are more similar to the target image based on the degrees of similarity calculated for the to-be-selected images (step S26). After this, the filter selecting section 50 selects one or more image filters 20 used to generate the selected to-be-selected images, as one or more image filters 20 that can convert the to-be-converted image into images that are more similar to the target image (step S27). After the step S27, the image processing apparatus 10 relating to the first modification example ends the above flow of the steps.

As mentioned above, the image processing apparatus 10 relating to the first modification example allows the user to visually check the weight assigning image used for the comparison between the target image and the to-be-selected images in each generation and to correct the weight assigning image as appropriate. Furthermore, the image processing apparatus 10 relating to the first modification example can calculate the degree of similarity between each to-be-selected image and the target image with the difference between the to-be-selected image and the target image being weighted appropriately in each region of the image. As a result, the image processing apparatus 10 relating to the first modification example can appropriately select a to-be-selected image similar to the target image from among a plurality of to-be-selected images.

When receiving from the user weight data associated with a given generation that has already been processed, the image processing apparatus 10 performs the following procedure. To begin with, on reception of the weight data associated with the given generation that have already been processed from the user, the weight receiving section 72 causes the filter storing section 32 to go back to the state of storing the image filters 20 associated with the given generation. Here, for example, the filter storing section 32 may be designed to store image filters 20 in association with each generation, that is to say, an image filter history, and the weight receiving section 72 may cause the filter storing section 32 to go back to the state of storing the image filters 20 associated with the given generation with reference to the image filter history. The weight receiving section 72 then causes the corresponding constituents to restart the procedure including the steps S12 to S15 of the flow chart shown in FIG. 8 from the given generation.

As described above, by enabling the user to change the weight data associated with a given generation that has already been processed, the image processing apparatus 10 can restart the image filter selecting procedure from the given generation. With such a configuration, if the image filter 20 selected in the last generation cannot generate a to-be-selected image similar to the target image, the image processing apparatus 10 may allow the user to change the weight data associated with a given generation so as to restart the image filter selecting operation from the given generation. Consequently, the image processing apparatus 10 can select an image filter 20 that can generate a to-be-selected image more similar to the target image without the necessity of restarting the image filter selecting procedure from the first generation.

Figure 20:
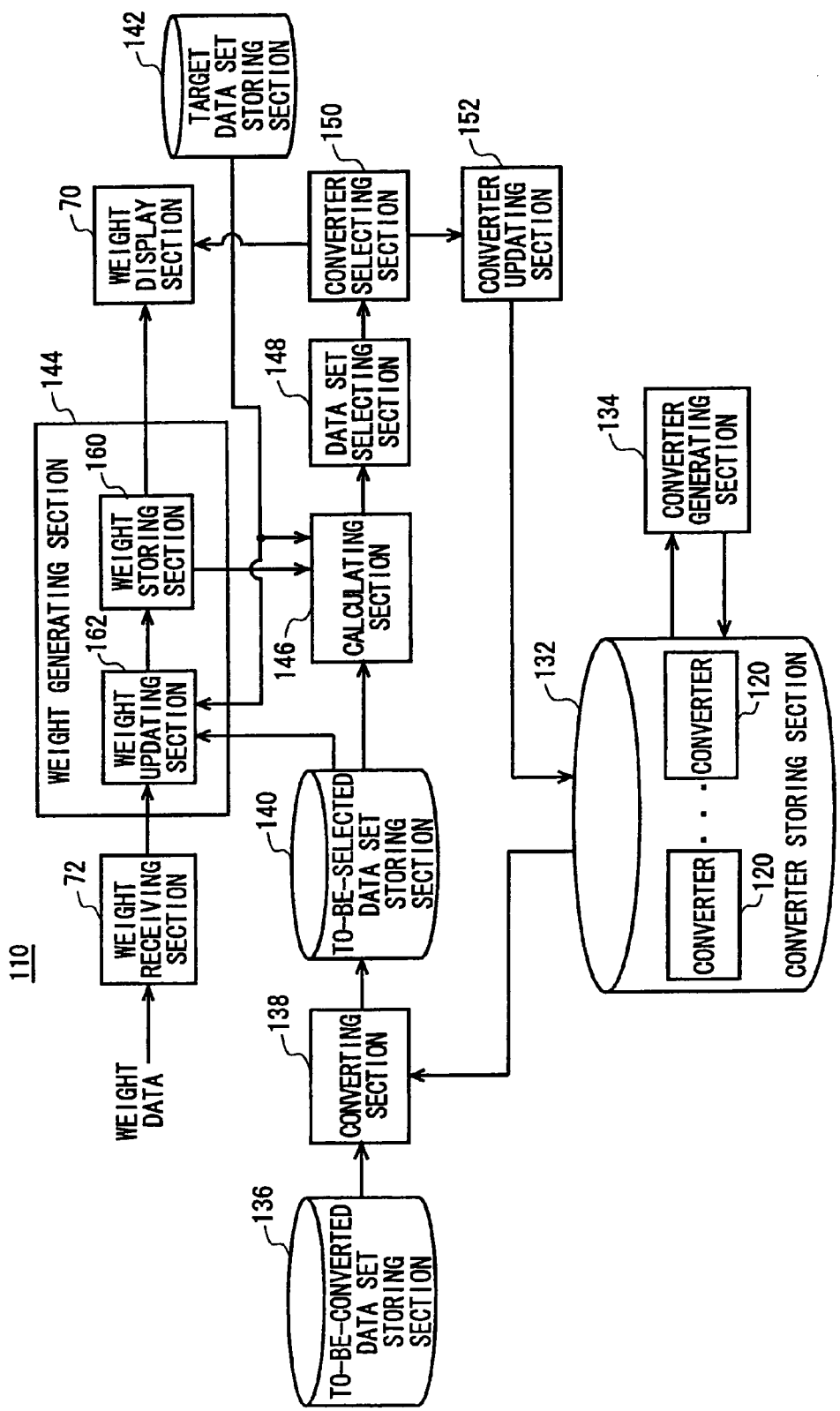
FIG. 20 illustrates the configuration of the processing apparatus 110 relating to a second modification example that is a modification example of the second embodiment.

FIG. 20 illustrates the configuration of the processing apparatus 110 relating to a second modification example that is a modification example of the second embodiment. The processing apparatus 110 relating to the second modification example has substantially the same configuration and functions as the processing apparatus 110 described with reference to FIGS. 12 to 17. Therefore, the constituents having substantially the same configuration and functions as the corresponding constituents of the processing apparatus 110 described with reference to FIGS. 12 to 17 are assigned the same reference numerals as in FIGS. 12 to 17. The following only describes the differences.

The processing apparatus 110 relating to the second modification example additionally includes a weight display section 70 and a weight receiving section 72. The weight display section 70 and the weight receiving section 72 relating to the second modification example have similar functions as the weight display section 70 and the weight receiving section 72 described with reference to FIGS. 18 and 19 except for that the second modification example deals with weight data sets and converters 120.

Accordingly, the processing apparatus 110 relating to the second modification example allows the user to visually check the weight data set used for the comparison between the target data set and the to-be-selected data sets in each generation and to correct the weight data set as appropriate. Furthermore, the processing apparatus 110 relating to the second modification example can calculate the degree of similarity between each to-be-selected data set and the target data set with the difference between the to-be-selected data set and the target data set being weighted appropriately in each piece of data. As a result, the processing apparatus 110 relating to the second modification example can appropriately select a to-be-selected data set approximate to the target data set from among a plurality of to-be-selected data sets.

Figure 21:
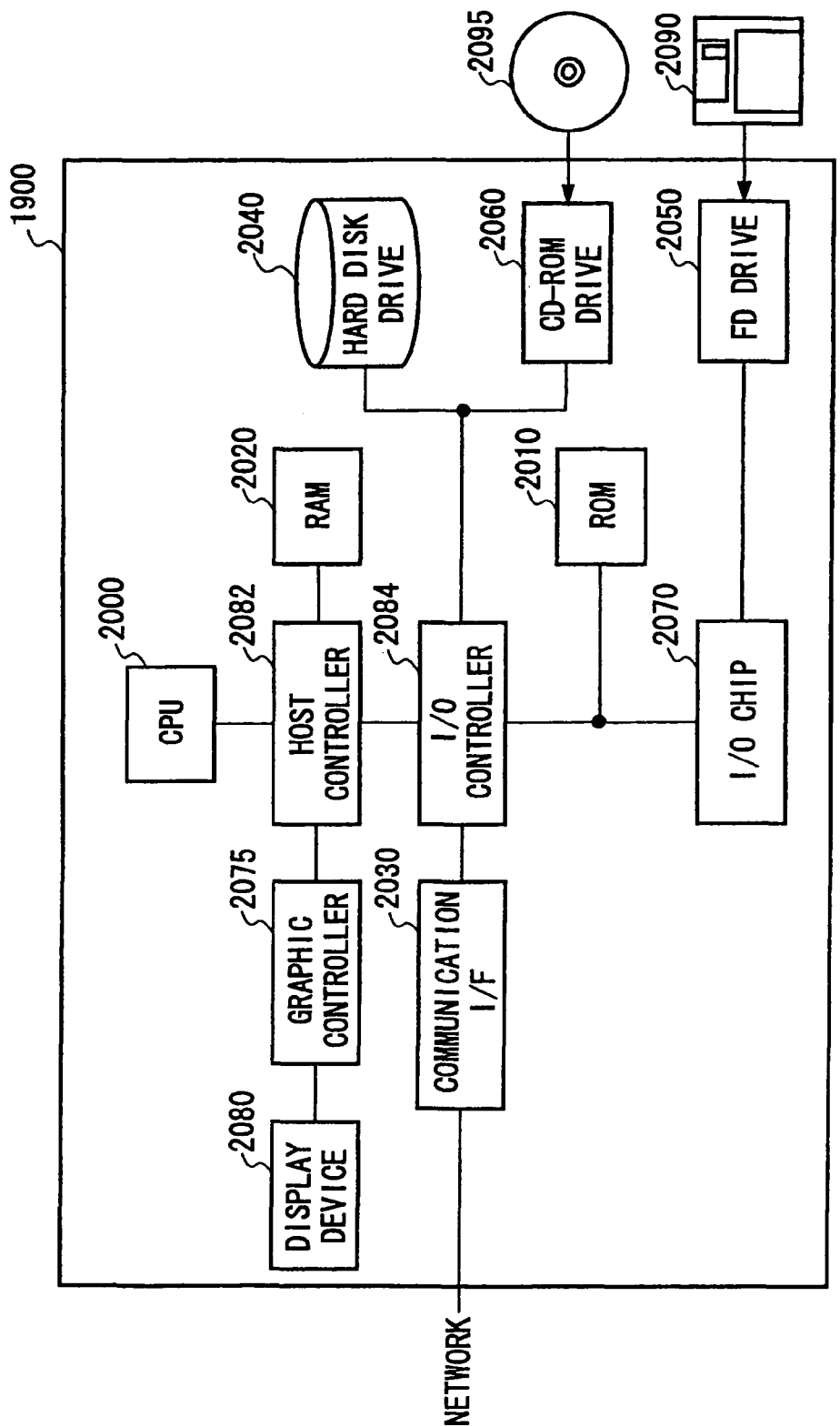
FIG. 21 illustrates an exemplary hardware configuration of a computer 1900 relating to the first and second embodiments.

FIG. 21 illustrates an exemplary hardware configuration of a computer 1900 relating to the first and second embodiments of the present invention. The computer 1900 relating to the first and second embodiments is constituted by a CPU peripheral section, an input/output (I/O) section and a legacy I/O section. The CPU peripheral section includes a CPU 2000, a RAM 2020, a graphic controller 2075 and a display device 2080 which are connected to each other by means of a host controller 2082. The I/O section includes a communication interface 2030, a hard disk drive 2040, and a CD-ROM drive 2060 which are connected to the host controller 2082 by means of an I/O controller 2084. The legacy I/O section includes a ROM 2010, a flexible disk drive 2050, and an I/O chip 2070 which are connected to the I/O controller 2084.

The host controller 2082 connects the RAM 2020 with the CPU 2000 and graphic controller 2075 which access the RAM 2020 at a high transfer rate. The CPU 2000 operates in accordance with programs stored on the ROM 2010 and RAM 2020, to control the constituents. The graphic controller 2075 obtains image data which is generated by the CPU 2000 or the like on a frame buffer provided within the RAM 2020, and causes the display device 2080 to display the obtained image data. Alternatively, the graphic controller 2075 may include therein a frame buffer for storing thereon the image data generated by the CPU 2000 or the like.

The I/O controller 2084 connects, to the host controller 2082, the hard disk drive 2040, communication interface 2030 and CD-ROM drive 2060 which are I/O devices operating at a relatively high rate. The communication interface 2030 communicates with different apparatuses via the network. The hard disk drive 2040 stores thereon programs and data to be used by the CPU 2000 in the computer 1900. The CD-ROM drive 2060 reads programs or data from a CD-ROM 2095, and supplies the read programs or data to the hard disk drive 2040 via the RAM 2020.

The I/O controller 2084 is also connected to the ROM 2010, flexible disk drive 2050 and I/O chip 2070 which are I/O devices operating at a relatively low rate. The ROM 2010 stores thereon a boot program executed by the computer 1900 at the startup, programs dependent on the hardware of the computer 1900, and the like. The flexible disk drive 2050 reads programs or data from a flexible disk 2090, and supplies the read programs or data to the hard disk drive 2040 via the RAM 2020. The I/O chip 2070 is used to connect the flexible disk drive 2050 to the I/O controller 2084, and to connect a variety of I/O devices to the I/O controller 2084 via a parallel port, a serial port, a keyboard port, a mouse port or the like.

The programs to be provided to the hard disk drive 2040 via the RAM 2020 are provided by a user in the state of being stored on a recording medium such as the flexible disk 2090, the CD-ROM 2095, and an IC card. The programs are read from the recording medium, and the read programs are installed in the hard disk drive 2040 in the computer 1900 via the RAM 2020, to be executed by the CPU 2000.

A program that is installed in the computer 1900 to cause the computer 1900 to function as the image processing apparatus 10 relating to the first embodiment includes a filter storing module, a filter generating module, a to-be-converted image storing module, a filtering module, a to-be-selected image storing module, a target image storing module, a weight generating module, a calculating module, an image selecting module, a filter selecting module, and a filter updating module. The program may additionally include a weight display module and a weight receiving module. The program or modules are operated by the CPU 2000 and the like to cause the computer 1900 to function as the filter storing section 32, the filter generating section 34, the to-be-converted image storing section 36, the filtering section 38, the to-be-selected image storing section 40, the target image storing section 42, the weight generating section 44, the calculating section 46, the image selecting section 48, the filter selecting section 50, the filter updating section 52, the weight display section 70 and the weight receiving section 72.

When read by the computer 1900, the information processing described in the program functions as the filter storing section 32, the filter generating section 34, the to-be-converted image storing section 36, the filtering section 38, the to-be-selected image storing section 40, the target image storing section 42, the weight generating section 44, the calculating section 46, the image selecting section 48, the filter selecting section 50, the filter updating section 52, the weight display section 70 and the weight receiving section 72, which are concrete means realized by software and the above-described various hardware resources working in cooperation. By using the concrete means to perform operations or modifications on information in accordance with the intended use of the computer 1900 relating to the first embodiment, the image processing apparatus 10 specific to the intended use is accomplished.

A program that is installed in the computer 1900 to cause the computer 1900 to function as the processing apparatus 110 relating to the second embodiment includes a converter storing module, a converter generating module, a to-be-converted data set storing module, a converting module, a to-be-selected data set storing module, a target data set storing module, a weight generating module, a calculating module, a data set selecting module, a converter selecting module, and a converter updating module. The program may additionally include a weight display module and a weight receiving module. The program or modules are operated by the CPU 2000 and the like to cause the computer 1900 to function as the converter storing section 132, the converter generating section 134, the to-be-converted data set storing section 136, the converting section 138, the to-be-selected data set storing section 140, the target data set storing section 142, the weight generating section 144, the calculating section 146, the data set selecting section 148, the converter selecting section 150, the converter updating section 152, the weight display section 70 and the weight receiving section 72.

When read by the computer 1900, the information processing described in the program functions as the converter storing section 132, the converter generating section 134, the to-be-converted data set storing section 136, the converting section 138, the to-be-selected data set storing section 140, the target data set storing section 142, the weight generating section 144, the calculating section 146, the data set selecting section 148, the converter selecting section 150, the converter updating section 152, the weight display section 70 and the weight receiving section 72, which are concrete means realized by software and the above-described various hardware resources working in cooperation. By using the concrete means to perform operations or modifications on information in accordance with the intended use of the computer 1900 relating to the second embodiment, the processing apparatus 110 specific to the intended use is accomplished.

For example, when the computer 1900 communicates with an external apparatus, the CPU 2000 executes a communication program loaded onto the RAM 2020 and instructs the communication interface 2030 to perform communication in accordance with the processes described in the communication program. Under the control of the CPU 2000, the communication interface 2030 reads transmission data stored on a transmission buffer region provided on storage devices such as the RAM 2020, the hard disk drive 2040, the flexible disk 2090, or the CD-ROM 2095 and transmits the read transmission data to the network. Also, under the control of the CPU 2000, the communication interface 2030 writes reception data received from the network into a reception buffer region provided on the storage devices. Thus, the communication interface 2030 may utilize Direct Memory Access technique to exchange the transmission and reception data with the storage devices. Alternatively, the transmission and reception data may be transferred in such a manner that the CPU 2000 reads data from a transfer source such as the storage devices or communication interface 2030, and writes the read data into a transfer destination such as the communication interface 2030 or storage devices.

The CPU 2000 instructs the RAM 2020 to read, via DMA transfer or any other technique, a necessary portion or all of the files or databases stored on external storage devices such as the hard disk drive 2040, the CD-ROM drive 2060 (CD-ROM 2095), and the flexible disk drive 2050 (flexible disk 2090), and performs a variety of operations on the data stored on the RAM 2020. The CPU 2000 then writes the processed data back to the external storage devices via DMA transfer or any other technique. In this case, the RAM 2020 can be considered as a component for temporarily storing the contents of the external storage devices. Therefore, in the first and second embodiments, the RAM 2020 and the external storage devices are collectively referred to as a memory, a storing section or a storage device. In the first and second embodiments, various information such as programs, data, tables, and databases are stored on such storage devices and to be processed. The CPU 2000 can move part of the information on the RAM 2020 to a cache memory, and perform reading/writing operations on the information on the cache memory. In such a case, the cache memory performs part of the function of the RAM 2020. Therefore, in the first and second embodiments, the cache memory is treated equally as the RAM 2020, memory, and/or storage device, unless otherwise stated.

The CPU 2000 performs a variety of operations including various operations described in the first and second embodiments, information modification, conditional judgment, information retrieval/replacement, which are designated by instruction sequences of programs, on the data read from the RAM 2020, and writes the processed data back to the RAM 2020. For example, when making a conditional judgment, the CPU 2000 judges whether a variety of variables described in the first and second embodiments satisfy a condition of being larger, smaller, no less, no more, or equal when compared with other variables or constants. When the condition is satisfied (or not satisfied), the CPU 2000 branches into a different instruction sequence, or invokes a subroutine.

The CPU 2000 can search through information stored on the files or databases within the storage devices. For example, assume a case where a storage device stores a plurality of entries in each of which an attribute value of a first attribute is associated with an attribute value of a second attribute. The CPU 2000 searches through the plurality of entries stored on the storage device to retrieve an entry whose attribute value of the first attribute matches a designated condition, and reads the attribute value of the second attribute stored in the retrieved entry. In this manner, the CPU 2000 can obtain the attribute value of the second attribute associated with the attribute value of the first attribute satisfying a predetermined condition.

The programs or modules mentioned above may be stored on an external recording medium. Such a recording medium is, for example, an optical recording medium such as DVD and CD, a magnet-optical recording medium such as MO, a tape medium, a semiconductor memory such as an IC card and the like, in addition to the flexible disk 2090 and CD-ROM 2095. Alternatively, the recording medium may be a storage device such as a hard disk or RAM which is provided in a server system connected to a dedicated communication network or the Internet, and the programs may be provided to the computer 1900 via the network.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. An image processing apparatus comprising:
   a weight generating section that generates weight data in which a weight of a first region is larger than a weight of a second region, based on at least one of a plurality of to-be-selected images derived from a single to-be-converted image, each of the plurality of to-be-selected images being a result of one or more of a plurality of filters applied to the single to-be-converted image and having substantially the same size as the single to-be-converted image;

a calculating section that calculates a degree of similarity between a target image and each of two or more of the plurality of to-be-selected images with a difference between the target image and the to-be-selected image being weighted in each region in accordance with the weight data; and an image selecting section that selects, from the two or more to-be-selected images, one or more to-be-selected images that are more similar to the target image, by referring to the degrees of similarity of the two or more to-be-selected images.

2. The image processing apparatus as set forth in claim 1, wherein the weight generating section generates the weight data such that the first region has a larger difference between any two or more of a plurality of to-be-selected images than the second region.

3. The image processing apparatus as set forth in claim 1, further comprising:

a filter generating section that newly generates one or more image filters by replacing one or more filter parts constituting at least part of an existing image filter with one or more different filter parts, each of the filter parts being capable of converting an input image into an output image;

a filtering section that converts the to-be-converted image by using the plurality of image filters to generate the plurality of to-be-selected images;

a weight display section that displays a weight assigning image representing a weight assigned to each region of an image in accordance with the weight data; and a filter selecting section that selects one or more image filters that generate one or more to-be-selected images that are more similar to the target image, by referring to the degrees of similarity of the two or more to-be-selected images, wherein the weight generating section generates the weight data further based on the target image.

4. The image processing apparatus of claim 3, wherein the weight display section displays the weight assigning image in association with at least one of the image filters selected by the filter selecting section.

5. The image processing apparatus of claim 3, wherein the filter generating section generates an image filter of a next generation by replacing one or more filter parts constituting at least part of an image filter of a current generation with one or more different filter parts, the weight generating section generates weight data of the next generation based on the target image and at least one of to-be-selected images generated by using image filters of the current generation, and the weight display section displays a weight assigning image in accordance with the weight data of the next generation when the weight data of the next generation is generated.

6. The image processing apparatus of claim 3, further comprising a weight receiving section that receives correction made by a user in the weight assigning image displayed by the weight display section to obtain corrected weight data, wherein when the user corrects the weight assigning image, the calculating section calculates the degree of similarity between the target image and each of the two or more of the plurality of to-be-selected images with a difference between the target image and the to-be-selected image being weighted in each region in accordance with the corrected weight data.

7. The image processing apparatus as set forth in claim 1, further comprising:

a filter generating section that newly generates an image filter by replacing one or more filter parts constituting at least part of an existing image filter with one or more different filter parts, each of the filter parts being capable of converting an input image into an output image;

a filtering section that converts the single to-be-converted image by using the plurality of image filters to generate the plurality of to-be-selected images;

a weight receiving section that receives from a user weight data representing a weight assigned to each region in the target image and the plurality of to-be-selected images; and a filter selecting section that selects one or more image filters that generate one or more to-be-selected images that are more similar to the target image based on the degrees of similarity of the two or more to-be-selected images.

8. The image processing apparatus as set forth in claim 7, wherein the filter generating section generates an image filter of a next generation by replacing one or more filter parts constituting at least part of an image filter of a current generation with one or more different filter parts, the filtering section converts a to-be-converted image by using a plurality of image filters to generate a plurality of to-be-selected images, and when receiving weight data associated with a given generation from the user, the weight receiving section changes weight data that is to be used to calculate the degree of similarity in the given generation or in the given and subsequent generations.

9. The image processing apparatus as set forth in claim 8, further comprising:

a filter storing section that stores image filters; and a filter updating section that updates the image filters stored in the filter storing section by using one or more image filters that generate to-be-selected images that are more similar to the target image, selected from the image filters of the current generation stored in the filter storing section and one or more image filters of the next generation generated by the filter generating section, wherein when receiving from the user the weight data of the given generation that has already been processed, the weight receiving section:

causes the filter storing section to go back to a state of storing one or more image filters associated with the given generation; and causes the filter generating section, the calculating section, and the filter updating section to restart corresponding operations from the given generation.

10. The image processing apparatus as set forth in claim 1, wherein the weight generating section generates the weight data such that the first region has a larger difference between the target image and at least one of a plurality of to-be-selected images than the second region.

11. The image processing apparatus as set forth in claim 10, further comprising:

a filtering section that converts the to-be-converted image by using a plurality of image filters to generate the plurality of to-be-selected images; and a filter selecting section that selects one or more image filters used to generate the to-be-selected images selected by the image selecting section, as one or more image filters that convert the to-be-converted image into images that are more similar to the target image.

12. The image processing apparatus as set forth in claim 11, wherein
the weight generating section includes:
a weight storing section that stores the weight data; and
a weight updating section that updates the weight data stored on the weight storing section in order to maintain a principle that the weight of the first region is larger than the weight of the second region where the difference is larger in the first region than in the second region.

13. The image processing apparatus as set forth in claim 12, further comprising:
a filter storing section that stores the plurality of image filters each of which is formed by combining together one or more filter parts, each filter part converting an image; and
a filter generating section that generates one or more new image filters by replacing one or more filter parts constituting at least part of at least one of the plurality of image filters stored on the filter storing section, with one or more different filter parts.

14. The image processing apparatus as set forth in claim 13, wherein
the weight updating section stores, onto the weight storing section, the weight data calculated for the plurality of image filters stored on the filter storing section,
the calculating section calculates the degree of similarity for each of the plurality of image filters and each of the new image filters,
the image selecting section newly selects a plurality of to-be-selected images that are more similar to the target image, by referring to the degrees of similarity calculated for the plurality of to-be-selected images generated by using the plurality of image filters and new to-be-selected images newly generated by using the new image filters,
the filter selecting section newly selects a plurality of image filters used to generate the plurality of to-be-selected images newly selected by the image selecting section,
the image processing apparatus further comprises
a filter updating section that updates the plurality of image filters stored on the filter storing section by using the plurality of image filters newly selected by the filter selecting section, and
the weight updating section updates the weight data stored on the weight storing section by using weight data newly generated for the updated plurality of image filters.

15. An image processing method comprising:
generating weight data in which a weight of a first region is larger than a weight of a second region, based on at least one of a plurality of to-be-selected images derived from a single to-be-converted image, each of the plurality of to-be-selected images being a result of one or more of a plurality of filters applied to the single to-be-converted image and having substantially the same size as the single to-be-converted image;
calculating a degree of similarity between a target image and each of two or more of the plurality of to-be-selected images with a difference between the target image and the to-be-selected image being weighted in each region in accordance with the weight data; and
selecting, from the two or more to-be-selected images, one or more to-be-selected images that are more similar to the target image, by referring to the degrees of similarity of the two or more to-be-selected images.

16. The image processing method as set forth in claim 15, wherein
the generating weight data comprises generating the weight data such that the first region has a larger difference between any two or more of a plurality of to-be-selected images than the second region.

17. The image processing method as set forth in claim 15, further comprising
newly generating one or more image filters by replacing part of an existing image filter with part of a different existing image filter, each of the parts being capable of converting an input image into an output image;
converting the single to-be-converted image by using each of the plurality of image filters to generate the plurality of to-be-selected images;
displaying at a weight display section a weight assigning image representing a weight assigned to each region of an image in accordance with the weight data; and
selecting one or more image filters that generate one or more to-be-selected images that are more similar to the target image, by referring to the degrees of similarity of the two or more to-be-selected images, wherein
the generating weight data comprises generating the weight data further based on the target image.

18. The image processing method as set forth in claim 15, further comprising:
newly generating one or more image filters by replacing part of an existing image filter with part of a different existing image filter, each of the parts being capable of converting an input image into an output image;
converting the single to-be-converted image by using the plurality of image filters to generate the plurality of to-be-selected images;
receiving from a user weight data representing a weight assigned to each region in the target image and the plurality of to-be-selected images; and
selecting one or more image filters that generate one or more to-be-selected images that are more similar to the target image based on the degrees of similarity of the two or more to-be-selected images.

19. The image processing method as set forth in claim 15, wherein
the generating weight data comprises generating the weight data such that the first region has a larger difference between the target image and at least one of a plurality of to-be-selected images than the second region.

20. A non-transitory computer program product having computer instructions, recorded on a non-transitory computer readable medium, for enabling a computer executing the computer instructions to perform operations comprising:
generating weight data in which a weight of a first region is larger than a weight of a second region, based on at least one of a plurality of to-be-selected images derived from a single to-be-converted image, each of the plurality of to-be-selected images being a result of one or more of a plurality of filters applied to the single to-be-converted image and having substantially the same size as the single to-be-converted image;
calculating a degree of similarity between a target image and each of two or more of the plurality of to-be-selected images with a difference between the target image and the to-be-selected image being weighted in each region in accordance with the weight data; and selecting, from the two or more to-be-selected images, one or more to-be-selected images that are more similar to the target image, by referring to the degrees of similarity of the two or more to-be-selected images.

21. The non-transitory computer readable medium on which the computer instructions of the computer program product of claim 20 are recorded.

22. A processing apparatus comprising:
a weight generating section that generates a weight data set in which a weight of first data is larger than a weight of second data, the first data having a larger difference between data sets than the second data, the difference being calculated per data between the data sets each including a plurality of pieces of data, the data sets forming at least one pair of data sets chosen from i) a plurality of to-be-selected data sets derived from a single to-be-converted data set, each of the plurality of to-be-selected data sets being a result of one or more of a plurality of converters applied to the single to-be-converted data set and having substantially the same size as the to-be-converted data set, and ii) a target data set;
a calculating section that calculates a degree of approximation between the target data set and each of two or more of the plurality of to-be-selected data sets, with a per-data difference between the target data set and the to-be-selected data set being weighted in each piece of data in accordance with the weight data set; and
a data set selecting section that selects, from the two or more to-be-selected data sets, one or more to-be-selected data sets that are more approximate to the target data set, by referring to the degrees of approximation of the two or more to-be-selected data sets.

23. The processing apparatus as set forth in claim 22, further comprising:
a converting section that converts the single to-be-converted data set by using the plurality of converters to generate the plurality of to-be-selected data sets, each converter converting an input data set into a converted data set; and
a converter selecting section that selects one or more converters that output the to-be-selected data sets selected by the data set selecting section, as one or more converters for converting the to-be-converted data set into data sets that are more approximate to the target data set.

24. The processing apparatus as set forth in claim 23, further comprising
a converter generating section that generates one or more converters of a next generation based on one or more converters of a current generation, wherein
the weight generating section generates a weight data set for a next generation based on at least one pair of data sets, where the data sets are chosen from one or more to-be-selected data sets output from one or more converters of current and preceding generations and the target data set, and
the calculating section calculates the degree of approximation for each of two or more to-be-selected data sets output from two or more converters of the next generation, with a per-data difference between the target data set and the to-be-selected data set being weighted in each piece of data in accordance with the weight data set of the next generation.

25. The processing apparatus as set forth in claim 24, wherein a converter is formed by combining together one or more converter parts each of which converts an input data set containing a plurality of pieces of input data into an output data set containing a plurality of pieces of output data, and the converter generating section generates the converters of the next generation by replacing, with one or more different converter parts, one or more converter parts constituting at least part of at least one of the converters of the current generation.

26. The processing apparatus as set forth in claim 25, wherein
the converter generating section provides, as the converters of the next generation, one or more converters selected from the converters of the current generation in a descending order of degrees of approximation of corresponding to-be-selected data sets.

27. The processing apparatus as set forth in claim 24, wherein
the weight generating section generates the weight data set of the next generation by referring to a per-data difference between the target data set and each of one or more to-be-selected data sets selected in a descending order of degrees of approximation thereof in each of one or more generations including the current and preceding generations.

28. The processing apparatus as set forth in claim 27, wherein
the weight generating section generates the weight data set of the next generation that is a monotonically nondecreasing function of a total obtained by adding together the per-data difference between the target data set and each of one or more to-be-selected data sets selected in a descending order of the degrees of approximation thereof in each of one or more generations including the current and preceding generations.

29. The processing apparatus as set forth in claim 27, wherein
the weight generating section generates the weight data set of the next generation that is a monotonically nondecreasing function of a total obtained by adding together the per-data difference between the target data set and each of one or more to-be-selected data sets selected in a descending order of the degrees of approximation thereof in each of one or more generations including the current and preceding generations with the per-data difference being weighted in accordance with the generation of the converter used to output the corresponding to-be-selected data set.

30. The processing apparatus as set forth in claim 27, wherein
the weight generating section generates the weight data set of the next generation that is a monotonically nondecreasing function of a total obtained by adding together the per-data difference between the target data set and each of one or more to-be-selected data sets selected in a descending order of the degrees of approximation thereof in each of one or more generations including the current and preceding generations with the per-data difference being weighted in accordance with the degree of approximation of the corresponding to-be-selected data set.

31. The processing apparatus as set forth in claim 27, wherein
the weight generating section generates the weight data set of the next generation that is a monotonically nondecreasing function of a total obtained by adding together the per-data difference between the target data set and each of one or more to-be-selected data sets selected in a descending order of the degrees of approximation thereof in each of a predetermined number of generations including the current and preceding generations.

32. The processing apparatus as set forth in claim 31, further comprising:
a generation number determining section that determines a number of generations used by the weight generating section to generate the weight data set of the next generation in each generation, according to a change of a maximum degree of approximation between each generation and an immediately preceding generation.

33. The processing apparatus as set forth in claim 24, wherein
the weight generating section updates the weight data set of the current generation based on a per-data difference between the target data set and each of one or more to-be-selected data sets selected in a descending order of the degrees of approximation thereof in the current generation, to generate the weight data set of the next generation.

34. The processing apparatus as set forth in claim 33, wherein
the weight generating section generates the weight data set of the next generation by calculating the per-data difference between the target data set and each of one or more to-be-selected data sets selected in a descending order of the degrees of approximation thereof in the current generation, obtaining a difference data set by subtracting a predetermined reference value from the calculated per-data difference, multiplying the difference data set by a predetermined coefficient to obtain a multiplication result, and adding the multiplication result to the weight data set of the current generation.

35. The processing apparatus as set forth in claim 23, wherein
each converter is an image filter for converting an input data set containing a plurality of pieces of pixel data into a converted image containing a plurality of pieces of pixel data.

36. The processing apparatus as set forth in claim 22, further comprising
a weight display section that displays a weight assigning image representing a weight assigned to each region of an image in accordance with the weight data set.

37. The processing apparatus as set forth in claim 22, further comprising
a weight receiving section that receives from a user the weight data set.

38. The processing apparatus as set forth in claim 11, further comprising:
a weight display section that displays a weight assigning image representing a weight assigned to each region of an image in accordance with the weight data set; and
a weight receiving section that receives from a user the weight data set.

39. A processing method comprising:
generating a weight data set in which a weight of first data is larger than a weight of second data, the first data having a larger difference between data sets than the second data, the difference being calculated per data between the data sets each including a plurality of pieces of data, the data sets forming at least one pair of data sets chosen from i) a plurality of to-be-selected data sets derived from a single to-be-converted data set, each of the plurality of to-be-selected data sets being a result of one or more of a plurality of converters applied to the single to-be-converted data set and having substantially the same size as the to-be-converted data set, and ii) a target data set;
calculating a degree of approximation between the target data set and each of two or more of the plurality of to-be-selected data sets, with a per-data difference between the target data set and the to-be-selected data set being weighted in each piece of data in accordance with the weight data set; and
selecting, from the two or more to-be-selected data sets, one or more to-be-selected data sets that are more approximate to the target data set, by referring to the degrees of approximation of the two or more to-be-selected data sets.

* * * * *